(12) United States Patent
Vasseur

(10) Patent No.: US 8,996,666 B2
(45) Date of Patent: Mar. 31, 2015

(54) QUALITY OF SERVICE (QOS) CONFIGURATION IN LOW-POWER AND LOSSY NETWORKS

(75) Inventor: Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 614 days.

(21) Appl. No.: 13/331,890

(22) Filed: Dec. 20, 2011

(65) Prior Publication Data

US 2013/0159479 A1    Jun. 20, 2013

(51) Int. Cl.
*G06F 15/177* (2006.01)
*H04L 12/801* (2013.01)

(52) U.S. Cl.
CPC ..................................... *H04L 47/10* (2013.01)
USPC ............................ 709/221; 709/220; 709/224

(58) Field of Classification Search
CPC . H04L 41/12; H04L 41/5009; H04L 41/5019; H04L 41/0869; H04L 43/0852
USPC ........................................ 709/220, 221, 224
See application file for complete search history.

(56) References Cited

U.S. PATENT DOCUMENTS

| 7,962,582 | B2 * | 6/2011 | Potti et al. ..................... | 709/220 |
| 8,005,000 | B1 | 8/2011 | Srinivasan | |
| 8,213,313 | B1 * | 7/2012 | Doiron et al. ................. | 370/235 |
| 8,503,315 | B2 * | 8/2013 | Wittgreffe ..................... | 370/252 |
| 2007/0156919 | A1 * | 7/2007 | Potti et al. ..................... | 709/238 |
| 2009/0225671 | A1 | 9/2009 | Arbel et al. | |
| 2013/0019005 | A1 * | 1/2013 | Hui et al. ...................... | 709/224 |

FOREIGN PATENT DOCUMENTS

WO    WO-2009140325 A1    11/2009
WO    WO-2011153222 A1    12/2011

OTHER PUBLICATIONS

Dimitrelis, et al., "Autoconfiguration of Routers Using a Link State Routing Protocol", draft-dimitri-zospf-00.txt, IETF Internet Draft, Oct. 2002, 17 pages.
Winter, et al., "RPL IPv6 Routing Protocol for Low Power and Lossy Networks", draft-ietf-roll-rpl-19, IETF Internet Draft, Mar. 2011, 164 pages.

* cited by examiner

*Primary Examiner* — Lynn Feild
*Assistant Examiner* — Jonathan Bui
(74) *Attorney, Agent, or Firm* — Parker Ibrahim & Berg LLC; James M. Behmke; Stephen D. LeBarron

(57) ABSTRACT

In one embodiment, a distributed intelligence agent (DIA) in a computer network performs deep packet inspection on received packets to determine packet flows, and calculates per-flow service level agreement (SLA) metrics for the packets based on timestamp values placed in the packets by respective origin devices in the computer network. By comparing the SLA metrics to respective SLAs to determine whether the respective SLAs are met, then in response to a particular SLA not being met for a particular flow, the DIA may download determined quality of service (QoS) configuration parameters to one or more visited devices along n calculated paths from a corresponding origin device for the particular flow to the DIA. In addition, in one or more embodiments, the QoS configuration parameters may be adjusted or de-configured based on whether they were successful.

21 Claims, 21 Drawing Sheets

QUALITY OF SERVICE (QOS) CONFIGURATION IN LOW-POWER AND LOSSY NETWORKS

TECHNICAL FIELD

The present disclosure relates generally to computer networks, and, more particularly, to quality of service (QoS) for low-power and lossy networks (LLNs).

BACKGROUND

Low-power and Lossy Networks (LLNs), e.g., sensor networks, have a myriad of applications, such as smart grid, smart cities, home and building automation, etc. Various challenges are presented with LLNs, such as lossy links, low bandwidth, battery operation, low memory and/or processing capability, etc. Large-scale IP smart object networks pose a number of technical challenges. For instance, the degree of density of such networks (such as Smart Grid networks with a large number of sensors and actuators, smart cities, or advanced metering infrastructure or "AMI" networks) may be extremely high: it is not rare for each node to see several hundreds of neighbors. This is particularly problematic for LLNs, where constrained links can wreak havoc on data transmission.

Applying quality of service (QoS) techniques are thus generally desired in order to maintain data transmission reliability and control delays in LLNs. However, since the devices themselves are also constrained, the complexity of QoS can be problematic. That is, a primary challenge lies in the overall complexity of QoS architectures in LLNs. For instance, policies must be specified for packet coloring, congestion avoidance algorithms must be configured on nodes, in addition to queuing disciplines. These algorithms all generally require a deep knowledge of the traffic pattern, link-layer characteristics, node resources, etc., and comprise a number of parameters to configure on each individual device to effectively provide adequate network-wide QoS.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
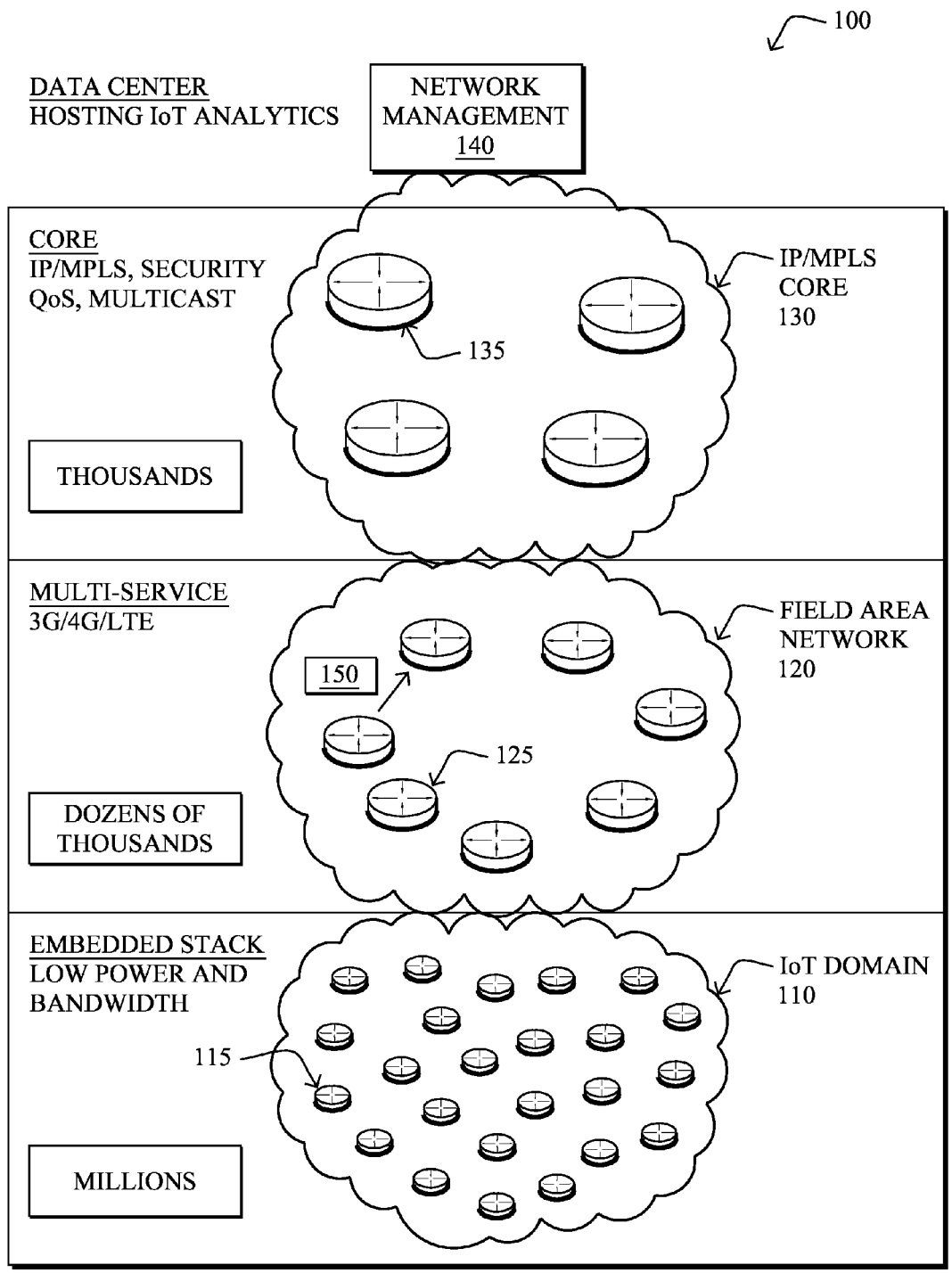
FIG. 1 illustrates an example computer network.

According to one or more embodiments of the disclosure, a distributed intelligence agent (DIA) in a computer network performs deep packet inspection on received packets to determine packet flows, and calculates per-flow service level agreement (SLA) metrics for the packets based on timestamp values placed in the packets by respective origin devices in the computer network. By comparing the SLA metrics to respective SLAs to determine whether the respective SLAs are met, then in response to a particular SLA not being met for a particular flow, the DIA may download determined quality of service (QoS) configuration parameters to one or more visited devices along n calculated paths from a corresponding origin device for the particular flow to the DIA. In addition, in one or more embodiments, the QoS configuration parameters may be adjusted or de-configured based on whether they were successful.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on is resources such as energy, memory, computational speed and bandwidth.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example computer network 100 illustratively comprising nodes/devices interconnected by various methods of communication. For instance, the links (not shown) may be wired links or shared media (e.g., wireless links, PLC links, etc.) where certain nodes, such as, e.g., routers, sensors, computers, etc., may be in communication with other nodes, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

According to the illustrative network 100, a plurality of network "hierarchies" may be created, where each hierarchy may, though need not, consist of a generally disparate type of device and/or communication protocol. As shown, an IoT domain 110 (also referred to as an LLN 110) may consist of an embedded stack of "objects" 115, such as sensors, actuators, etc., as described above, interconnected by generally low-power and/or lossy links. Illustratively, the IoT domain may conceivably consist of millions of objects 115.

Each IoT domain 110 (only one shown for clarity) may be interconnected to a next hierarchical level, such as a field area network 120, which illustratively provides the edge of the "cloud" or core network 130. The field area network(s) 120 may interconnect one or more IoT domains to the core network 130, and generally comprises a plurality of routers 125 (or switches or gateways). In an example embodiment, communication at the field area networks may comprise multi-service protocols, such as "3G," "4G," "LTE," etc., as will be clearly understood in the art. Typically, the number of devices 125 within a field area network could reach dozens of thousands.

Ultimately, as noted, the field area networks 120 (one shown for clarity) are interconnected by a core network 130, such as an Internet Protocol (IP) network and/or Multi-Protocol Label Switching (MPLS) network of generally more-capable devices 135 (e.g., thousands of them), such as core routers, switches, etc. Generally, this hierarchical level controls the security, quality of service (QoS), multicast operation, etc. of the IoT domain in addition to supporting these features within the Field Area Network itself. A is network management component 140 may exist within the core network 130, or else may be interconnected via the core network 130, to provide various high-level functionality, such as hosting of IoT analytics, network management services (NMS), etc. For example, the network management component 140 may consist of one or more servers configured to provide high-level control over the network operations of network 100, and may provide an interface to users (administrators), as described herein.

Data packets 150 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. As mentioned, each hierarchy may, though need not, utilize a different protocol than each other, and may, in fact, utilize a different protocol than other sub-domains within a hierarchy (e.g., different IoT domains 110 or field area networks 120).

Figure 2A:
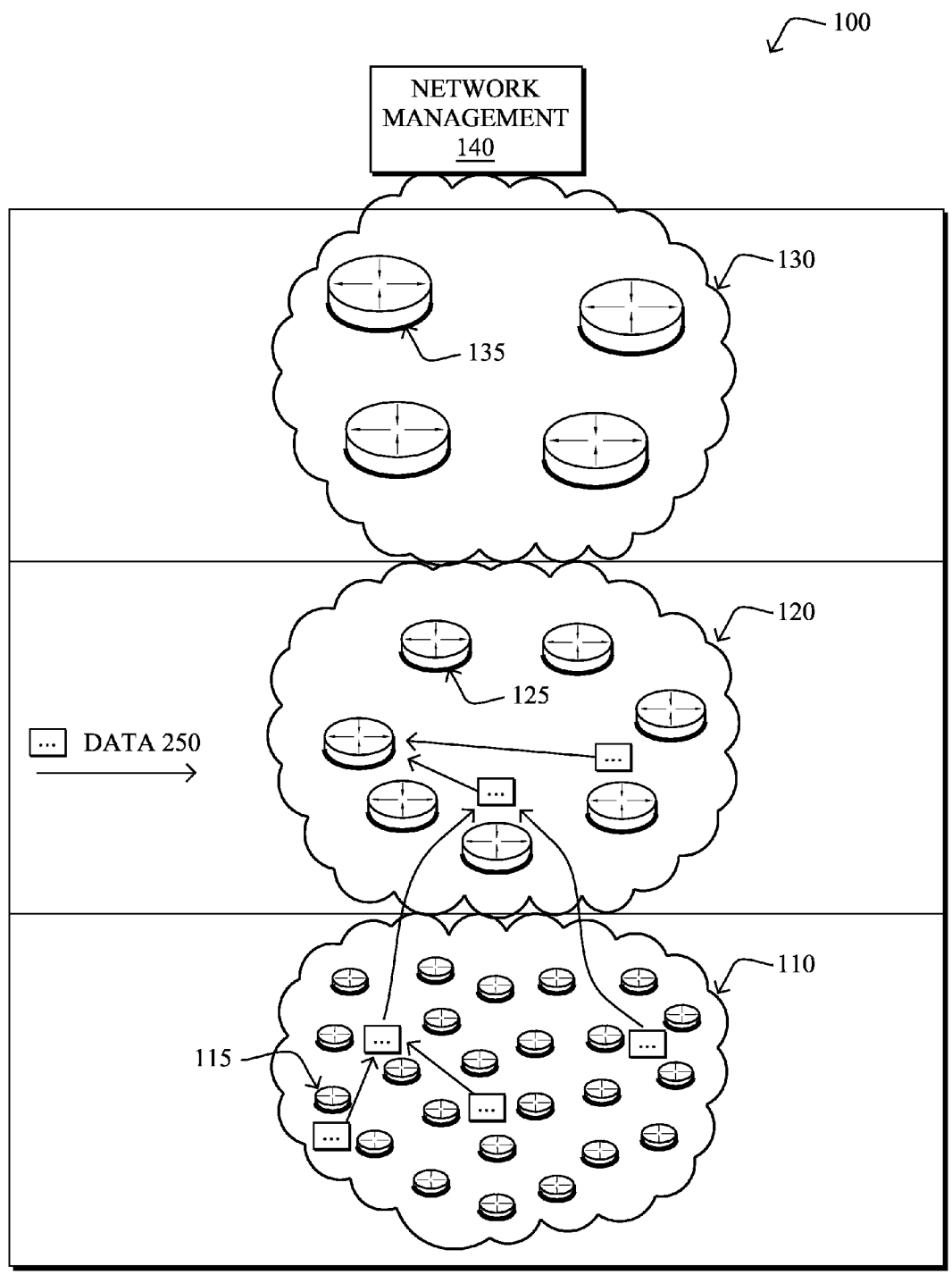
FIGS. 2A-2E illustrate examples of data flow within the computer network of FIG. 1.
Figure 2B:
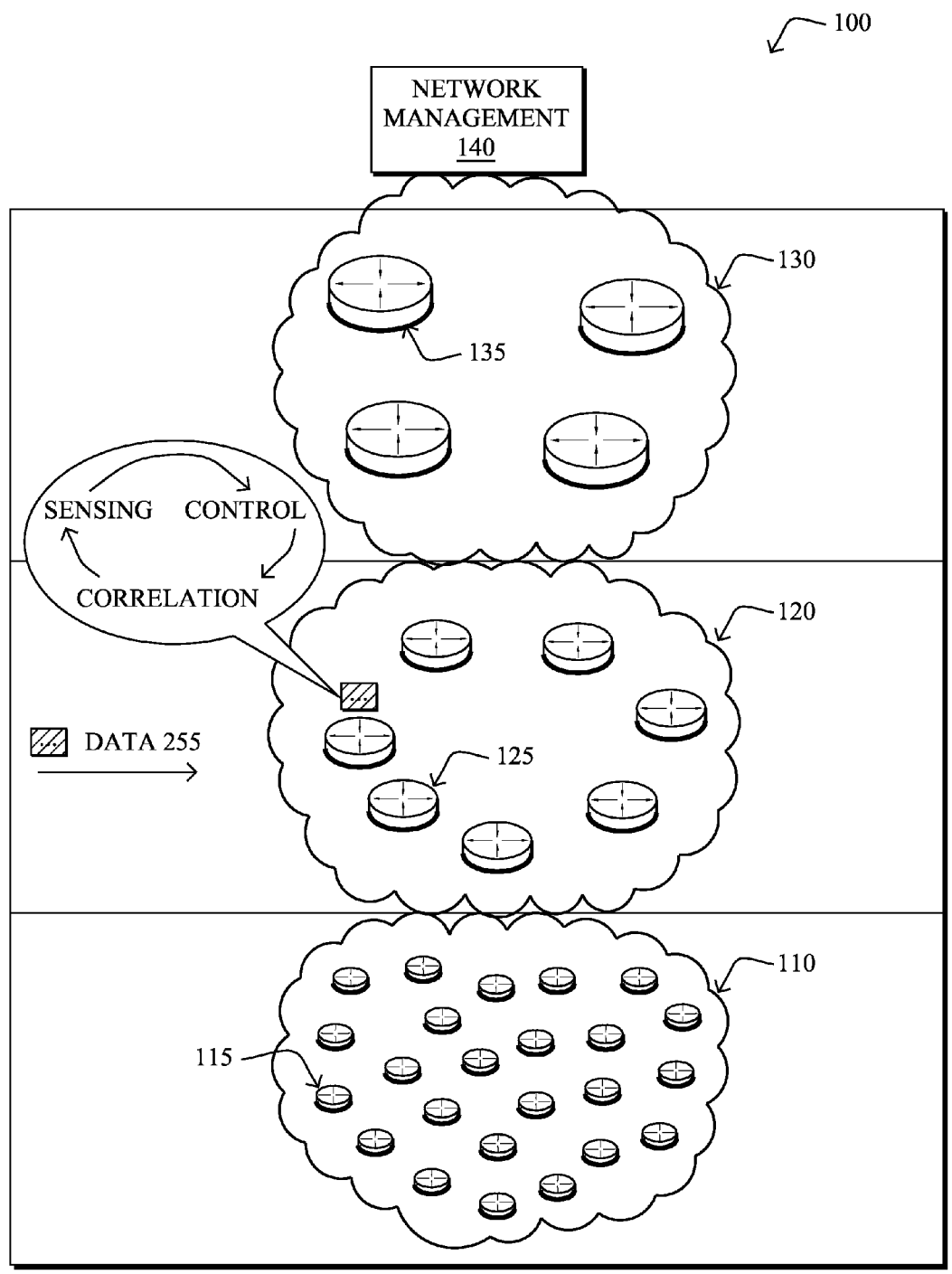
Figure 2C:
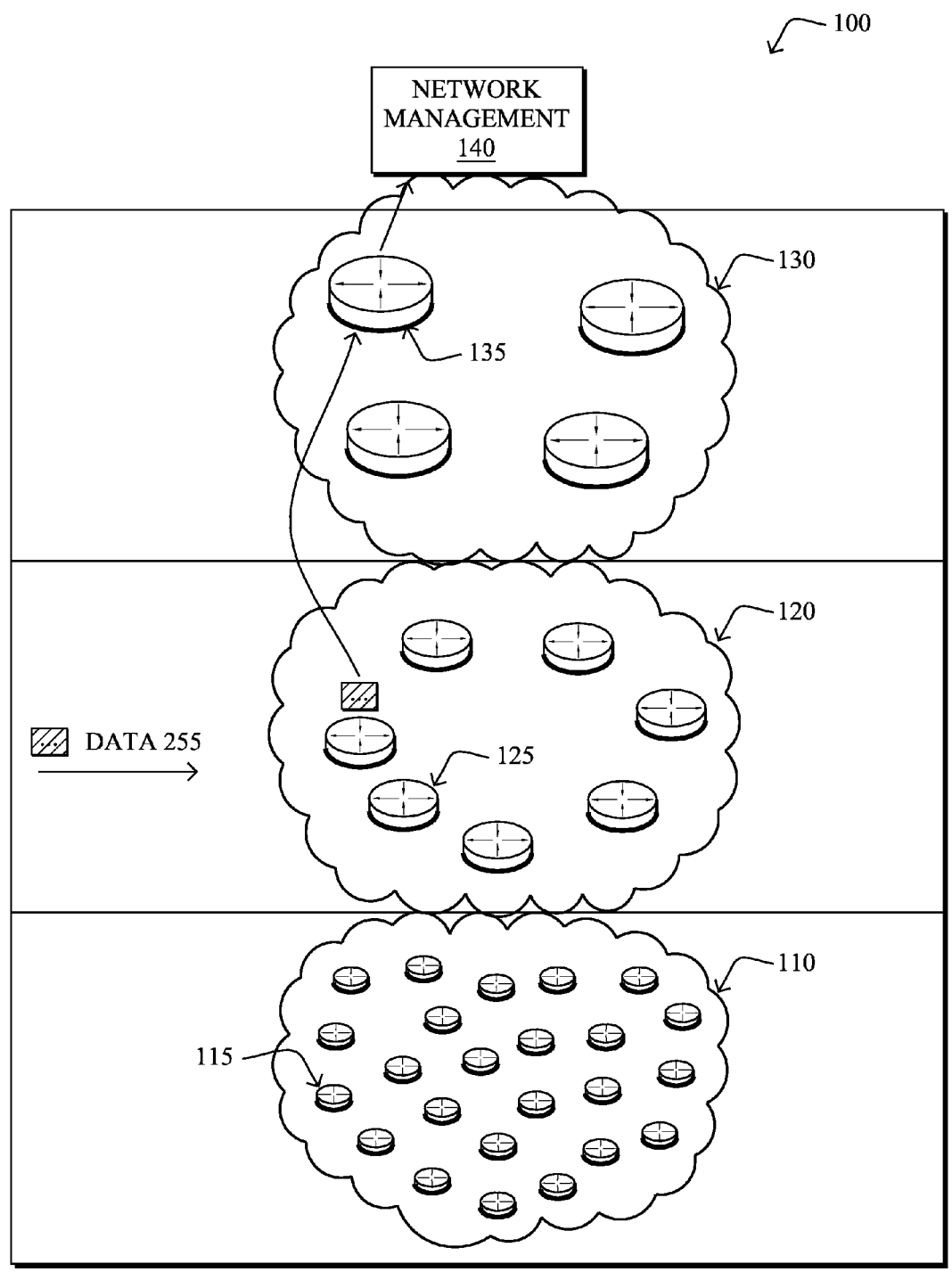
Figure 2D:
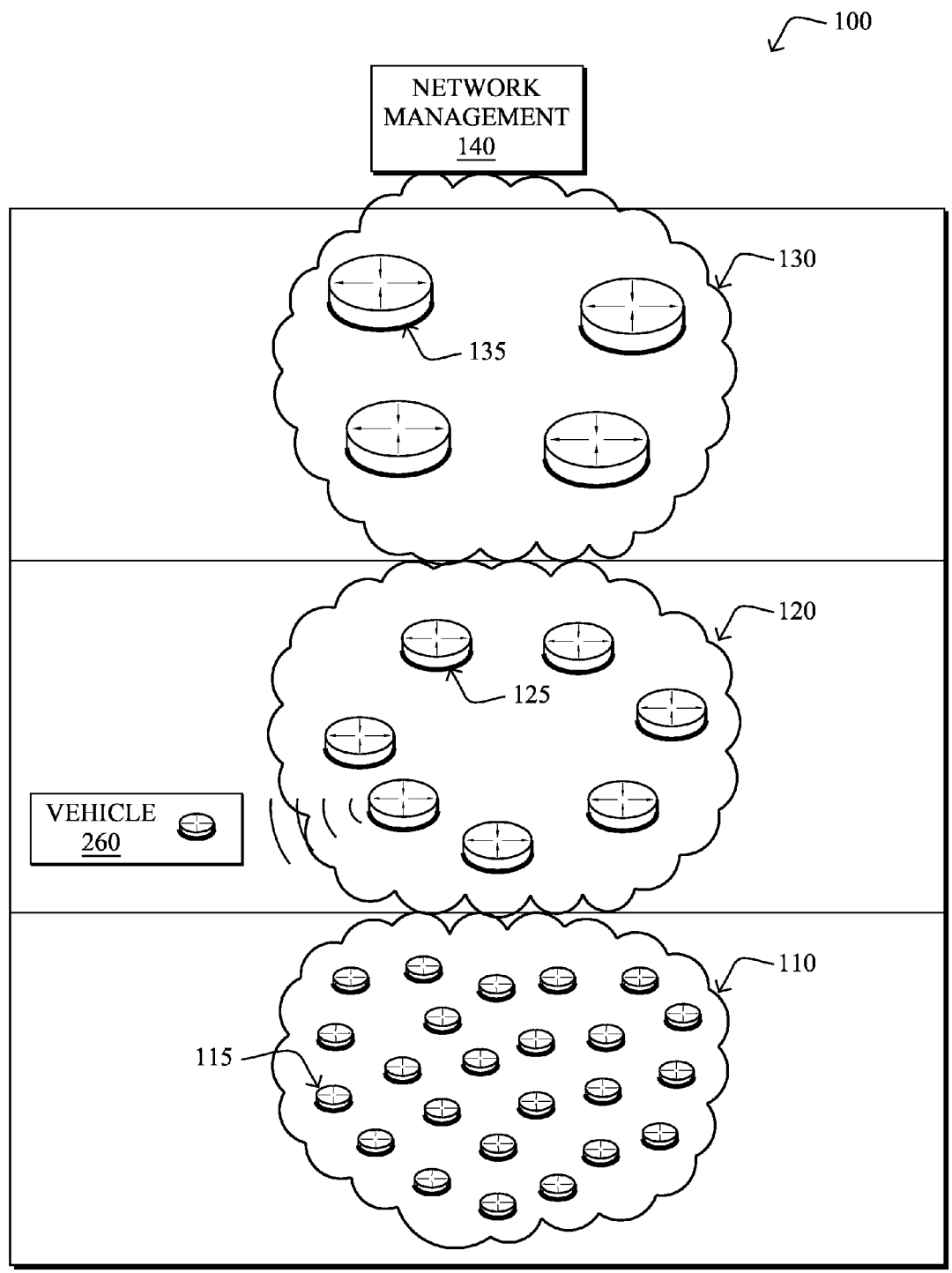
Figure 2E:
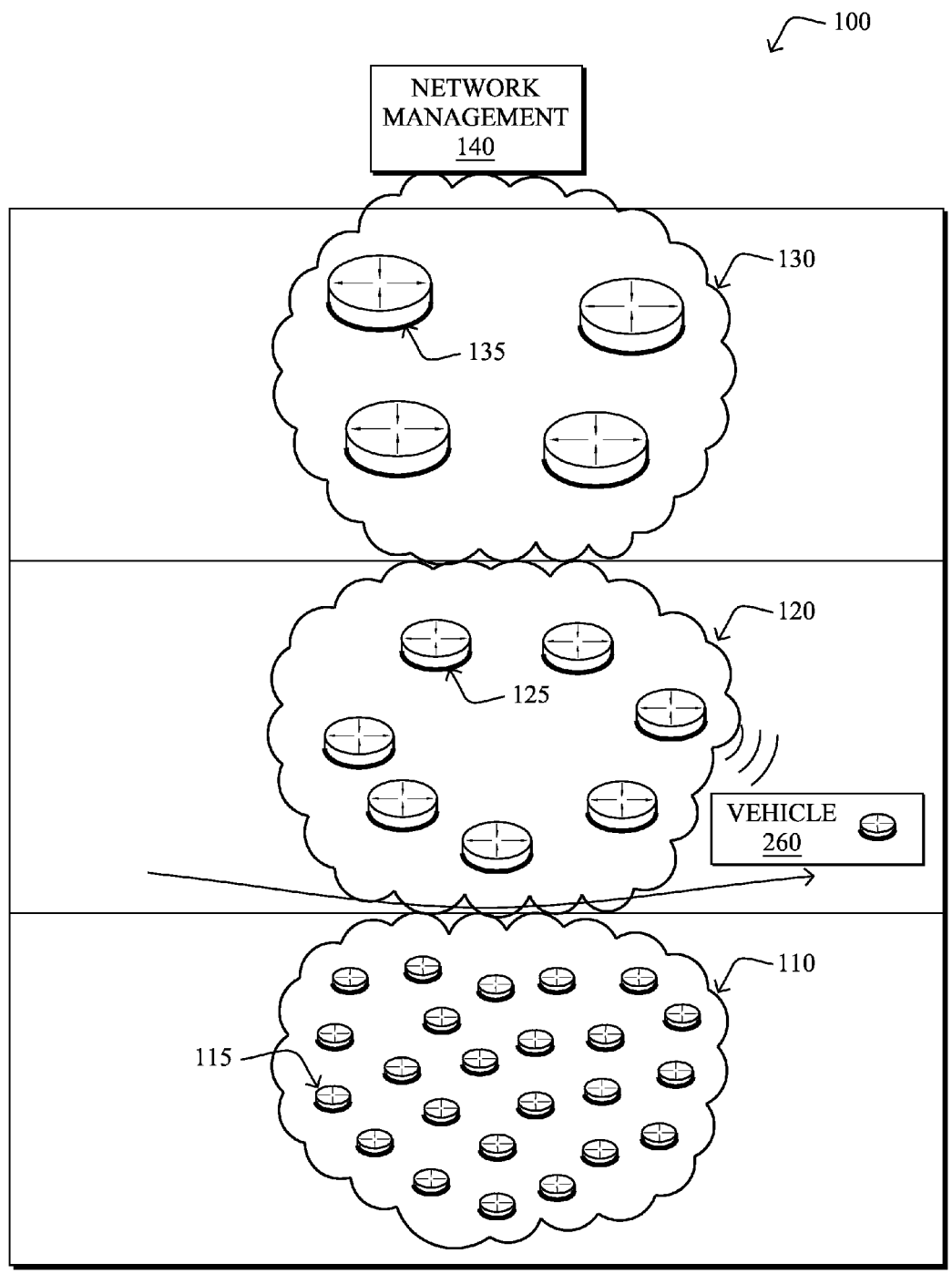

FIGS. 2A-2E illustrate example data flows within the computer network 100 of FIG. 1, such as in accordance with general IoT operation, and as may be used in accordance with the techniques described herein. For example, as shown in FIG. 2A, data 250 may be collected by various objects 115, and transmitted (e.g., as a packet 150) along the way to one or more field area network devices 125, and may be subjected to various degrees of aggregation, dropping, etc. along the way. The field area network devices 125 may then, as shown in FIG. 2B, apply further intelligence to the data 250, such as sensor applications, control, and correlation, and the processed data 255 may then be transmitted to the network management devices 140 as shown in FIG. 2C. Moreover, as a specific example of IoT operation to illustrate mobile objects, FIGS. 2D and 2E illustrate how an object 115, such as a vehicle 260 (generally, as a vehicle may actually comprise many network connected "objects"), may travel between IoT domains 110, and may be transferred between field area network devices 125 (such as field area routers or "FARs") or even field area networks 120 in general, depending upon proximity.

As noted above, over the past few years, the notion of smart connected objects such as sensors and actuators has opened the door to an endless number of applications such as smart grids, connected vehicles, smart cities, or smart healthcare to mention a very few. To that end, several "architectures" have been proposed, consisting of either connecting these devices through multi-protocol gateways or using IP (v6) end-to-end, in addition to various mixed options.

The idea of using multi-protocol gateways causes problems for a number of reasons, though are beneficial for protocol migration and limited in-time strategies offering a migration path from existing legacy protocols to IP. Some of the problems include operational complexity, lack of scalability (exponential number of protocol conversions), lack of QoS and routing consistency, single point of failure (the use of statefull multi-protocol gateways being a very costly option), security holes, etc.

Accordingly, a clear momentum in favor of IP end-to-end has emerged and a number of technologies have been developed and specified since 2007:

Lightweight operating systems running on low-power micro-controllers equipped with a few Kbytes of RAM and Flash and 8/16-bit micro-controllers; and Optimized IPv6 stacks and the emergence of new low-power PHY/MAC technologies (e.g., IEEE 802.15.4, low-power Wifi, P1901.2, PRIME, HP GreenPHY, etc.).

After careful analysis of the IP protocol suite, it was recognized that new IP protocols were required for these highly constrained and harsh environments. Some key examples include:

1) 6LoWPAN: an adaptation layer handling fragmentation for low MTU links in addition to header compression;
2) RPL: a new routing protocol for LLNs;
3) CoAP: a lightweight resource management protocol designed to run on low-power end devices, significantly lighter than SNMP; and
4) Various optimization functions hosted at the link layer (e.g., frequency hopping for 15.4 g, PLC (P1901.2), etc.).

So far, the typical strategy consisted of implementing sophisticated networking protocols on constrained devices, responsible of handling QoS, routing, management, traffic engineering, sensing, algorithms for traffic reduction in the LLN, sophisticated strategies to increase channel capacity on low-bandwidth links, self-healing techniques for fast failure restoration in addition to constrained-routing, call admission control (CAC) and back-pressure mechanisms, etc. In other words, the goal has been to make the Internet of Things (IoT) as smart as possible, still while bounding the required resources at the edge the IoT (LLN).

Figure 3:
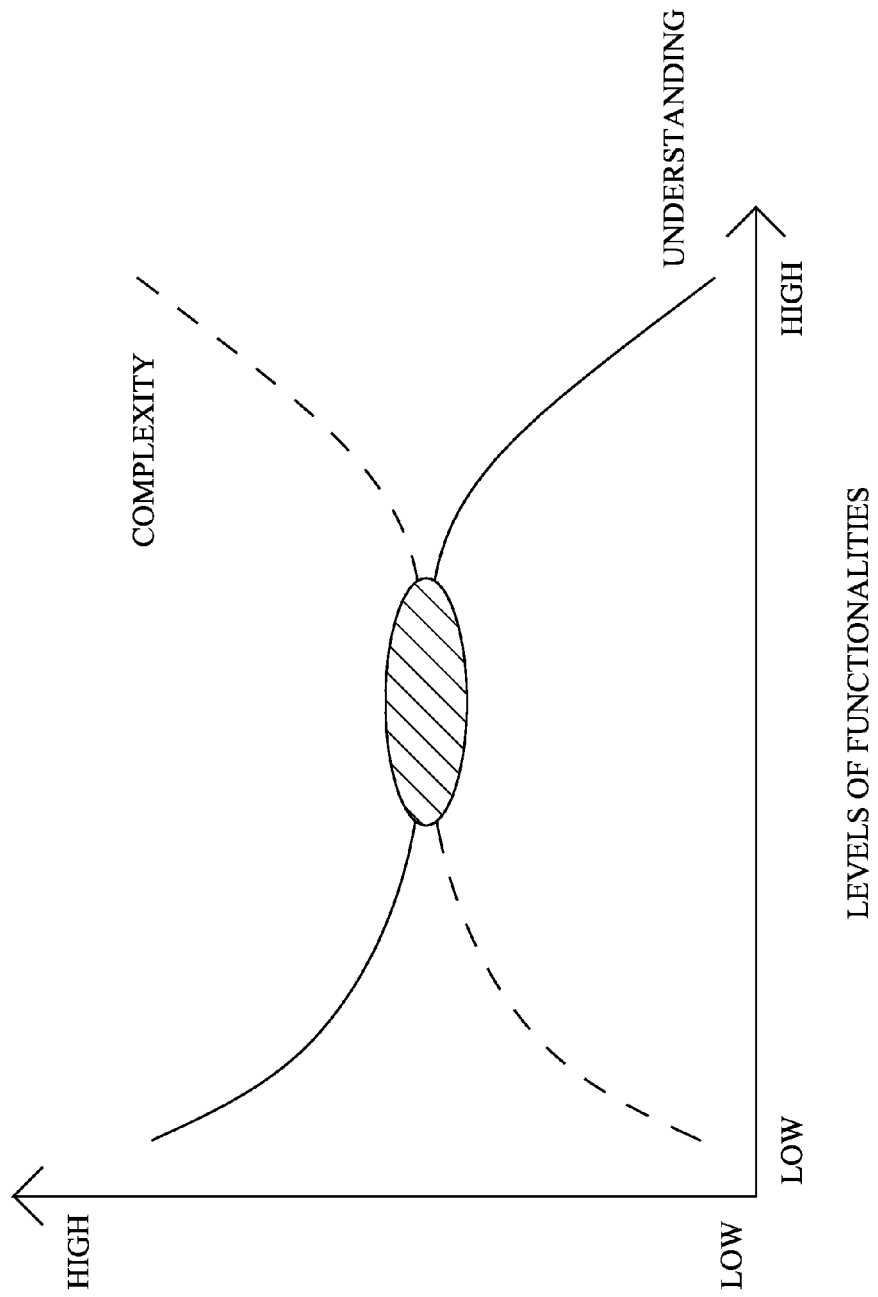
FIG. 3 illustrates an example trade-off between functionality and scalability in complex systems.

There is, however, a delicate trade-off between functionality and scalability in complex systems. That is, in many areas, one can obverse the phenomena shown in FIG. 3. As functionalities are added to devices, the complexity of the overall system combining all features (also simply referred to as "the network") increases to a point where incremental cost is acceptable before hitting an inflection point, at which time the overall understanding and scalability of that system drops dramatically. Although it is quite challenging to model mathematically such models with stochastic Petri networks or Markov chains, such an empirical analysis is mostly driven by years of experience designing and operating complex systems. Note that although scalability is a multi-polynomial function varying according to a number of factors, the weight of the "understanding" factor is undoubtedly large; in many circumstances, technologies have not been adopted in the field, not because they were intrinsically non-scalable from a technological standpoint but because understanding the overall system was too costly in light of the added value for the end-user. For example, from a purely technological standpoint, even though certain systems can be understood, as the level of functionality increases the number of pathological non-understood cases also grows extremely rapidly.

After a few years of deep technical investigations, the overall complexity to be supported by smart objects does not grow linearly with the size of these networks and the is number of supported features, but rather it grows exponentially, causing the scalability of the overall system itself to collapse. In the case of the IoT, we can expect an amplification of this phenomena for two reasons: (1) The scale of such network largely exceeds the largest known networks so far with potentially millions of devices; and (2) unexpectedly, the design of lightweight protocols (with a small footprint in terms of memory and bandwidth usage) requires quite sophisticated techniques with unknown behavioral patterns leading to added complexity in this part of the network, also known as the LLN (Low-power and Lossy Networks) or IP Smart Object Networks.

An objective of the illustrative network architecture described herein is to rethink the current model consisting of adding distributed intelligence of end devices and instead to limit the intelligence to the minimum required to provide secured connectivity. As described below, intermediate agents hosted on edge devices of the Field Area Network (e.g. routers) referred herein to as edge routers are introduced that assist these end devices in a number of decision making processes (QoS, network management, traffic engineering, etc.) and closely interact with central intelligence (hosted or more capable computers, e.g., in a data center) in order to make appropriate decisions, for instance, thanks to learning machines fed by traffic observation (e.g., deep packet inspection), a set of objectives (e.g., Service Level Agreements or SLAs), performance monitoring, analysis of behavioral patterns and network dynamics (e.g., to trade-off between optimality and stability), etc.

In particular, the illustrative architecture address switching intelligence and network control to the router edge boundary. As pointed out above, it is worth thinking of a radically new networking model for the Internet of Things (IoT), leading to a radical shift in terms of networking in a number of areas such as routing, self-healing techniques, QoS, CAC, NMS, reliability or security. According to the embodiments described below, the techniques herein generally consist of moving the networking intelligence at the second-tier of the network, on routers located at the fringe of the LLN (sometimes referred to as LBRs: LLN Border Routers) where resources can be considered as "non-limited" by contrast with devices (sensors/actuators/tags) in the LLNs. The main principle lies into the ability for the LBR and other components (applications running on routers, out-of-band routers/servers, etc.) to host functions where the output of which is then provided to Minimalistic Connected Objects or "MCOs" (which may also be referred to as "dumb connected objects or "DCOs" as contrasted to "smart objects").

In this illustrative architectural model, sensors/actuators purposefully become IPv6 "minimalistic connected objects" as opposed to smart objects (the trend the whole industry has been promoting for the last decade).

As rationale, one primary technological reason lies in the ability to scale networks to a size an order of magnitude larger than the current Internet. Simple math shows that extremely large-scale LLNs imply very advanced technologies (not previously specified and/or known) in order to effectively manage these networks. It thus becomes important to note that such networks are to be autonomic, self-configured, and embedded with local intelligence to support self-healing technologies and auto-configuration, and capable of performing local troubleshooting. Breaking large domains into smaller ones helps to reduce the overall complexity, but only as a temporary measure.

By adopting a radically different strategy consisting of making these devices "merely connected" as opposed to "smart," the architecture described herein will enable a large eco-system, enable connectivity on extremely constrained devices (including energy scavenger enabled devices), and the network will be "fed" with valuable data, thus increasing the rationale for the network to host in-bound intelligence, making it the platform of the future.

In particular, a radically different architecture may be used for the Internet of Things (IoT)/LLNs whereby smart objects are replaced by Minimalistic Connected Objects (MCOs) limited to providing basic secure connectivity to an LBR, at the fringe of "classic IP networks" connecting LLNs. LBRs illustratively host Distributed Intelligence Agents (DIAs), which are software/hardware modules fed by a number of inputs such as, e.g., traffic flow observation using deep packet inspection, SLA requirements specified by the user and provided by a Central Intelligence Controller (CIC). DIAs may also host a learning machine observing the flows and also the network is dynamics and behavior trends, such that the DIA may further perform a number of tasks interacting with MCOs to activate when/where/if the required networking features such as network management, routing, quality of service (QoS), call admission control (CAC), etc. in the network.

Figure 4:
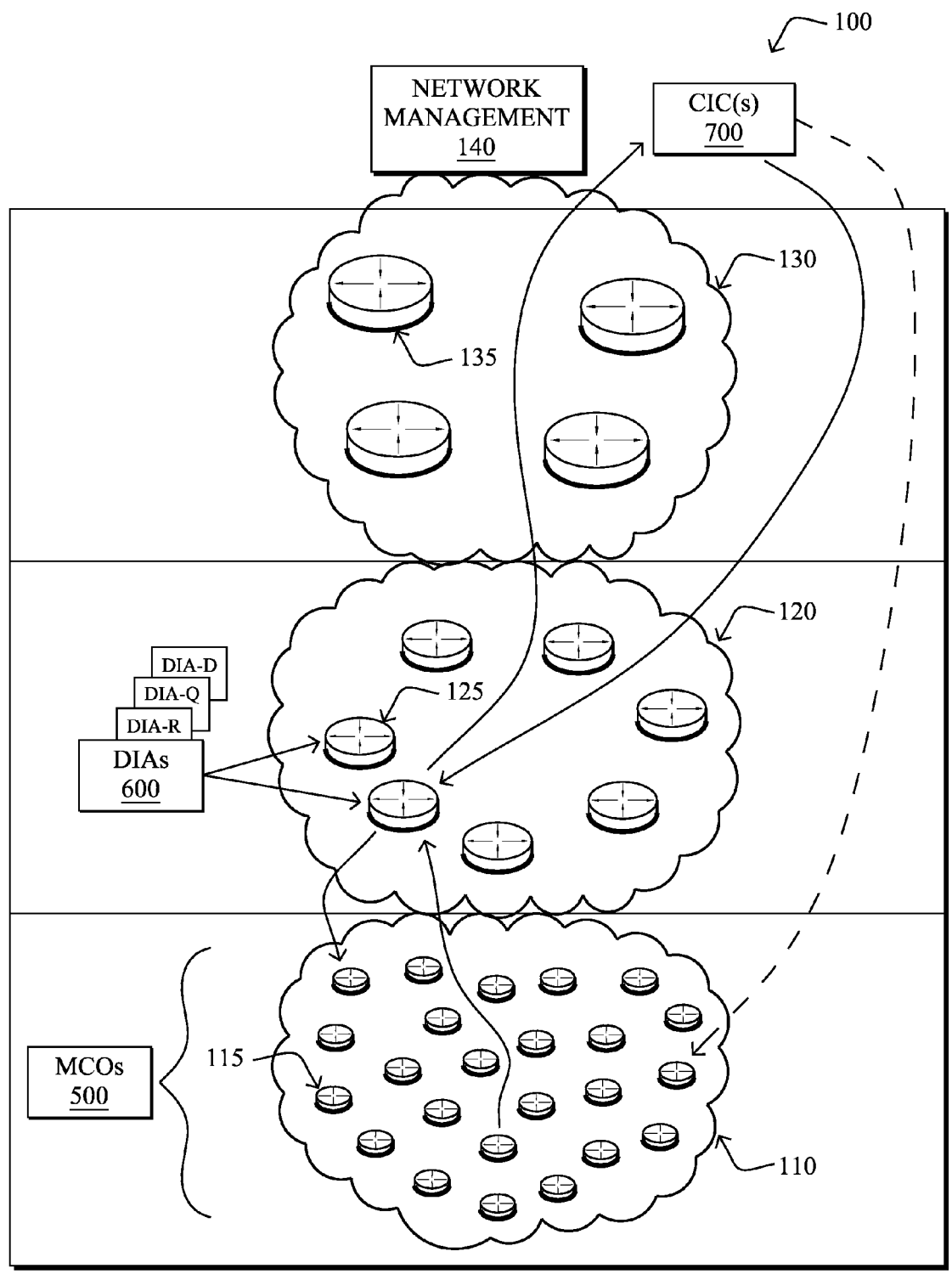
FIG. 4 illustrates an example view of the computer network in accordance with the architecture described herein for minimalistic connected objects (MCOs)

That is, an illustrative network architecture, as shown in FIG. 4, comprises one or more minimalistic connected objects (MCOs) 500, one or more distributed intelligence agents (DIAs) 600, and one or more central intelligence controllers (CICs) 700. Specifically, each MCO generally has limited intelligence sufficient to perform its respective designated task, securely join a computer network, and provide nominal state information, where the MCOs are not configured to perform complex application-specific data processing and complex networking tasks, such as making quality of service (QoS) decisions, participating in call admission control (CAC) operations, providing traffic engineering (TE) services, executing sophisticated reliability protocols, or extrapolating network management information, which contrasts with current IoT architectures. Also, the DIAs are configured to provide an edge to the computer network for the MCOs, and are responsible for intelligent networking management for the MCOs and for performing complex application-specific data processing for the MCOs. Lastly, the CICs operate within the computer network and are in communication with the DIAs to perform complex tasks for overarching control of MCO and DIA operation, and are also configured to provide one or more interfaces to receive a set of user-defined rules for the MCO and DIA operation.

Illustratively, the techniques described herein with respect to the illustrative architecture may be performed by hardware, software, and/or firmware, such as in accordance with respective processes specific to each type of device (MCO, DIA, CIC), which may contain computer executable instructions executed by a processor to perform functions relating to the novel techniques described herein, e.g., in conjunction with other processes executing on the respective devices. For example, the techniques herein may be treated as extensions to conventional protocols, such as various routing, communication, and/or management protocols, and as such, may be processed by similar components understood in the art that execute those types of protocols, accordingly.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while certain processes may be shown separately, those skilled in the art will appreciate that processes may be routines or modules within other processes.

According to the illustrative architecture, as noted above, a Minimalistic Connected Object (MCO) 500 is an object (e.g., sensor, actuator, radio frequency identifier (RFID) tag, or simple degenerated router) with an extremely lightweight processing requirement due to low intelligence and decision-making. By contrast with the current "Smart Objects" approach, an MCO has just enough intelligence to join a network using a degenerated routing approach, in a secure fashion, and provides just enough state information to the DIA/CIC (described below) with regards to its functionalities, resources, and supported capability. The MCOs generally perform no (self-directed) QoS or any form of CAC, TE, sophisticated reliability features, network management information (e.g., network statistics), and no application-specific data processing, since these functions are now hosted on the DIA 600, as described below.

Figure 5:
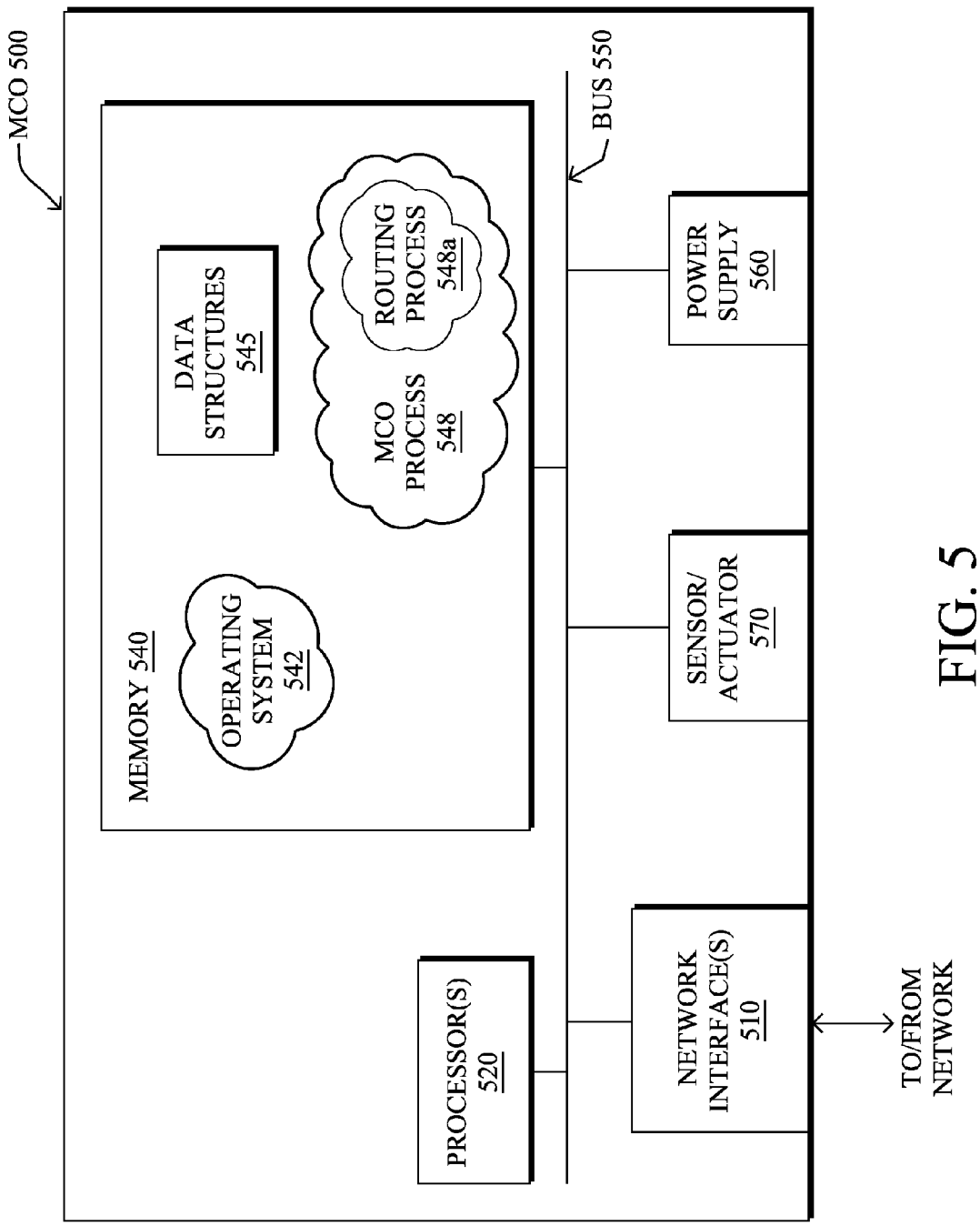
FIG. 5 illustrates an example of an MCO device.

FIG. 5 is a schematic block diagram of an example device 500 that may be used with one or more embodiments described herein as an MCO. The device may comprise one or more network interfaces 510 (e.g., wired, wireless, PLC, etc.), a processor 520, and a memory 540 interconnected by a system bus 550, as well as a power supply 560 (e.g., battery, plug-in, etc.). In addition, an MCO may generally comprise a sensor and/or actuator component 570.

The network interface(s) 510 contain the mechanical, electrical, and signaling circuitry for communicating data over links coupled to the network 100, i.e., in IoT domain 110. The network interfaces may be configured to transmit and/or receive data using a variety of different communication protocols. Note, further, that the nodes may is have two different types of network connections 510, e.g., wireless and wired/physical connections, and that the view herein is merely for illustration. Also, while the network interface 510 is shown separately from power supply 560, for PLC the network interface 510 may communicate through the power supply 560, or may be an integral component of the power supply. In some specific configurations the PLC signal may be coupled to the power line feeding into the power supply.

The memory 540 comprises a plurality of storage locations that are addressable by the processor 520 and the network interfaces 510 for storing software programs and data structures associated with the embodiments described herein. Note that certain devices may have limited memory or no memory (e.g., no memory for storage other than for programs/processes operating on the device and associated caches). The processor 520 may comprise necessary elements or logic adapted to execute the software programs and manipulate the data structures 545. An operating system 542, portions of which are typically resident in memory 540 and executed by the processor, functionally organizes the device by, inter alia, invoking operations in support of software processes and/or services executing on the device. These software processes and/or services may illustratively comprise an "MCO process" 548, which may comprise one or more sub-processes, such as routing process/services 548a, as described herein.

As noted above, each MCO 500 has limited intelligence sufficient to perform its respective designated task (e.g., sense, actuate, route), securely join a computer network, and provide nominal state information. As such, MCO process 548 thus contains computer executable instructions executed by the processor 520 to perform functions related to such MCO actions, accordingly. As described herein, therefore, MCO process is not configured to perform complex application-specific data processing, make QoS decisions, participate in CAC operations, provide TE services, execute sophisticated reliability protocols, or extrapolate network management information. Routing process 548a is a generally degenerated routing process, and is kept simple enough to provide communication from the MCO 500 to other devices (other MCOs 500 or DIAs 600), accordingly. For example, topology information may be simply received from the DIAs is as mentioned below, or else where MCOs are completely incapable of storing routing entries, routing process 548 may consist solely of providing mechanisms necessary for source routing techniques. That is, for source routing, other devices in the network can tell the less capable devices exactly where to send the packets, and the less capable devices simply forward the packets as directed. Alternatively, a minimalistic version of a routing protocol may be used, such as various simplified link-state protocols, e.g., a zeroconfiguration Open Shortest Path First or "zOSPF" as specified in an Internet Engineering Task Force (IETF) Internet Draft entitled "Autoconfiguration of routers using a link state routing protocol"<draft-dimitri-zospf-00> by Dimitrelis, at al. (October 2002 version), or else a simplified version of RPL, the full version of which is specified in the IETF Internet Draft entitled "RPL: IPv6 Routing Protocol for Low Power and Lossy Networks"<draft-ietf-roll-rpl-19> by Winter, et al. (Mar. 13, 2011 version).

According to the illustrative architecture described herein, another type of device, the Distributed Intelligence Agent (DIA) 600, consists of set of software/hardware modules hosted at the edge of the network (field area network 120), and are responsible for a number of networking and application oriented functionalities such as routing within the IoT/LLN 110, decisions on whether/if/how to dynamically activate QoS, CAC, Traffic Engineering, NMS-related processing (e.g., aggregation of networking statistics), application aware data processing (e.g., hosting an application that could interpret the data from the MCOs 500, potentially aggregate/drop data packets, trigger local actuation, etc.). The DIA 600 is hosted typically on a more capable device (e.g., an edge router) equipped with Deep packet Inspection, Internet Protocol flow information export (IPFIX) operational capability, etc., as may be appreciated by those skilled in the art.

Figure 6:
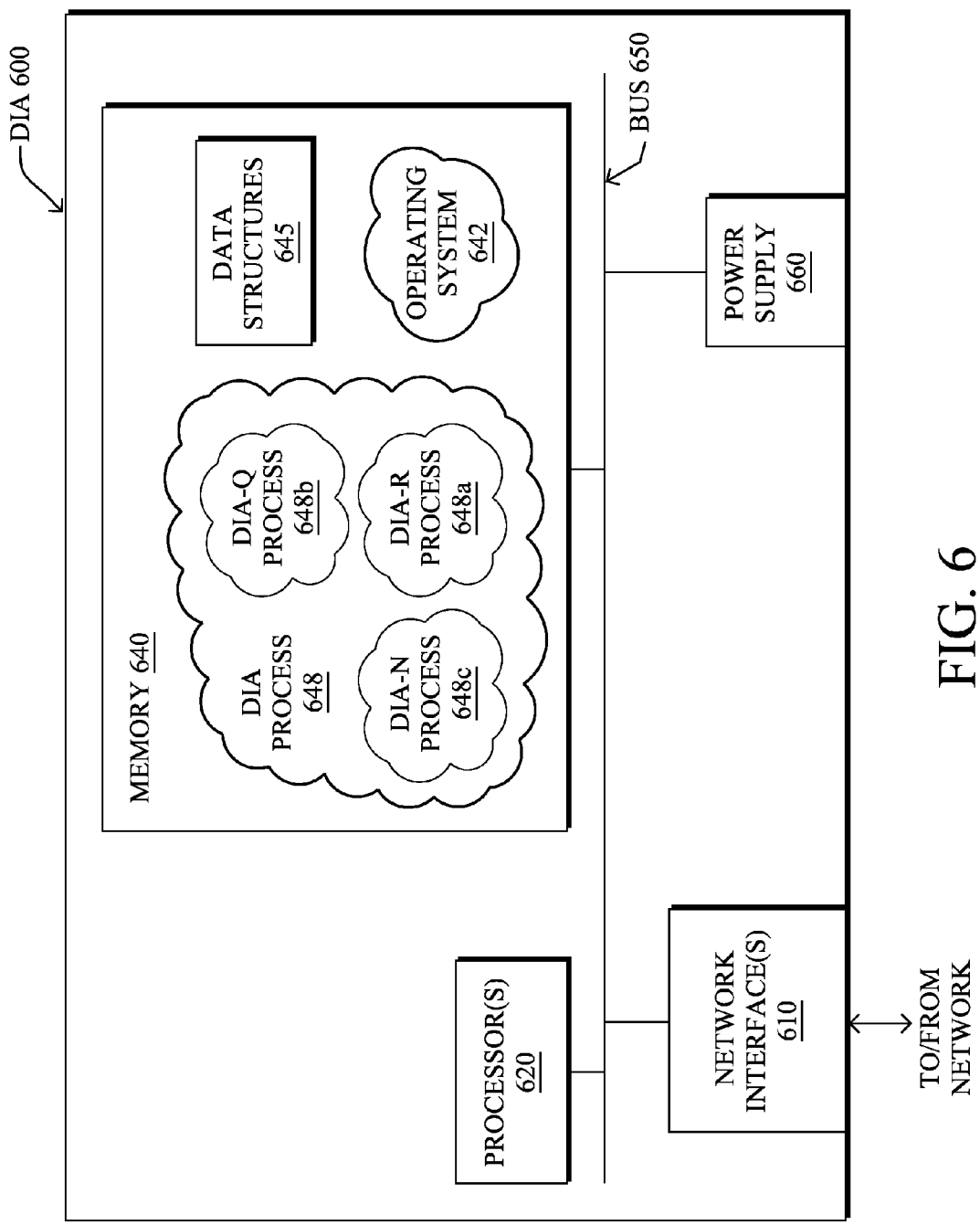
FIG. 6 illustrates an example of a distributed intelligence agent (DIA) device.

FIG. 6 is a schematic block diagram of an example device 600 that may be used with one or more embodiments described herein as a DIA. Similar to device 500, the DIA device 600 may comprise one or more network interfaces 610, at least one processor 620, and a memory 640 interconnected by a system bus 650, as well as a power supply 660 (e.g., plug-in). Generally, DIA device 600 is more capable than the limited MCO devices 500, and as such, may have greater processing capability, greater memory, etc.

Within the memory 640, an operating system 642 functionally organizes the is device by, inter alia, invoking operations in support of software processes and/or services executing on the device, such as a "DIA process" 648, which may comprise one or more sub-processes, such as "DIA-R" process 648a, "DIA-Q" process 648b, "DIA-N" process 648c, etc., as described herein. That is, DIAs may be made of a set of intelligence modules each responsible for specific tasks: DIA-N (NMS) 648c, DIA-Q (QoS) 64ab, DIA-R (Routing) 648a, etc., in addition to application-related features (not related to the networking intelligence itself). Further, memory 640 may also be used to store one or more data structures 645, accordingly.

As noted above, each DIA 600 is configured to provide an edge to the computer network for the MCOs, and is responsible for intelligent networking management for the MCOs and for performing complex application-specific data processing for the MCOs. As such, DIA process 648 contains computer executable instructions executed by the processor 620 to perform functions related to such DIA actions, accordingly. As described herein, therefore, DIA process 648 is configured to perform complex application-specific data processing, such as interpreting data from the MCOs, aggregating data from the MCOs, dropping data from the MCOs, and triggering local actuation at the MCOs, as mentioned above. In addition, the DIA process 248 is further responsible for making QoS decisions (DIA-Q process 648b) for the MCOs, participating in CAC operations for the MCOs, providing TE services for the MCOs, and extrapolating network management information (DIA-N process 648c) for the MCOs, etc. Routing process (DIA-R) 648a contains computer executable instructions executed by the processor 620 to perform functions provided by one or more routing protocols, such as proactive or reactive routing protocols as will be understood by those skilled in the art. These functions may, on capable devices, be configured to manage a routing/forwarding table (a data structure 645) containing, e.g., data used to make routing/forwarding decisions.

Notably, DIAs 600 heavily rely on state reports provided by MCOs, traffic observation using deep packet inspections and IPFIX, but also closely interact with the CIC(s) 700 in order to determine the service level agreement and/or performance is monitoring so as to determine whether network performances are aligned with the objectives (e.g., where performance results reports are provided by the DIA-N). In order to accomplish this, the various DIA processes 248 (modules 248a-c . . . ) may interact with each other: for example DIA-R (routing) may interact with the DIA-Q (QoS) so as to determine the consequences of a routing topology change on Quality of Service. Note that such collaboration is now possible, which is not the case with the current fully distributed models. That is, DIA 600 in general are intelligent modules in charge of performing tasks of various nature such as computing routing topologies, determining when/where/whether activating QoS in the network, performing local tasks related to NMS (instead of adopting a peer-to-peer network management function between the NMS and devices as in today's models), determining how to perform traffic engineering, etc. (Notably, the specifics of these features/algorithms and related protocols may be specified in detail elsewhere, and such specifics lie outside the scope of the present disclosure.)

Output decisions from the DIAs 600 result in sending messages (e.g., unicast or more rarely multicast messages) to MCOs 500 requesting behavioral changes, such as changes to forwarding decisions, activation of a QoS feature such as marking packets or applying priority to packets, activation and/or management of data generation (e.g., starting, stopping, and/or timing the sending of sensed data, such as if the sensed data has been determined as incorrect or non-coherent, or redundant, or unchanging, etc.). In addition, DIAs 600 may request the CIC(s) 700 to perform certain corrective actions, and CIC(s) may interact directly with an MCO 500, for example, in an attempt to download a new software/firmware upgrade on a dysfunctional device.

According to the illustrative architecture described herein, the final defined type of device, the Central Intelligence Controller (CIC) 700, is used to host more complex tasks for controlling the IoT domain 110, but also for receiving a set of rules defined by an end-user (e.g., specification of service level agreements (SLAs), levels of security, tasks for performance monitoring, etc.). The CIC(s) will have direct communication with the DIAs 600 that would make decisions and in turn communicate with MCOs, though in some cases the CIC may directly interact with MCOs 500.

Figure 7:
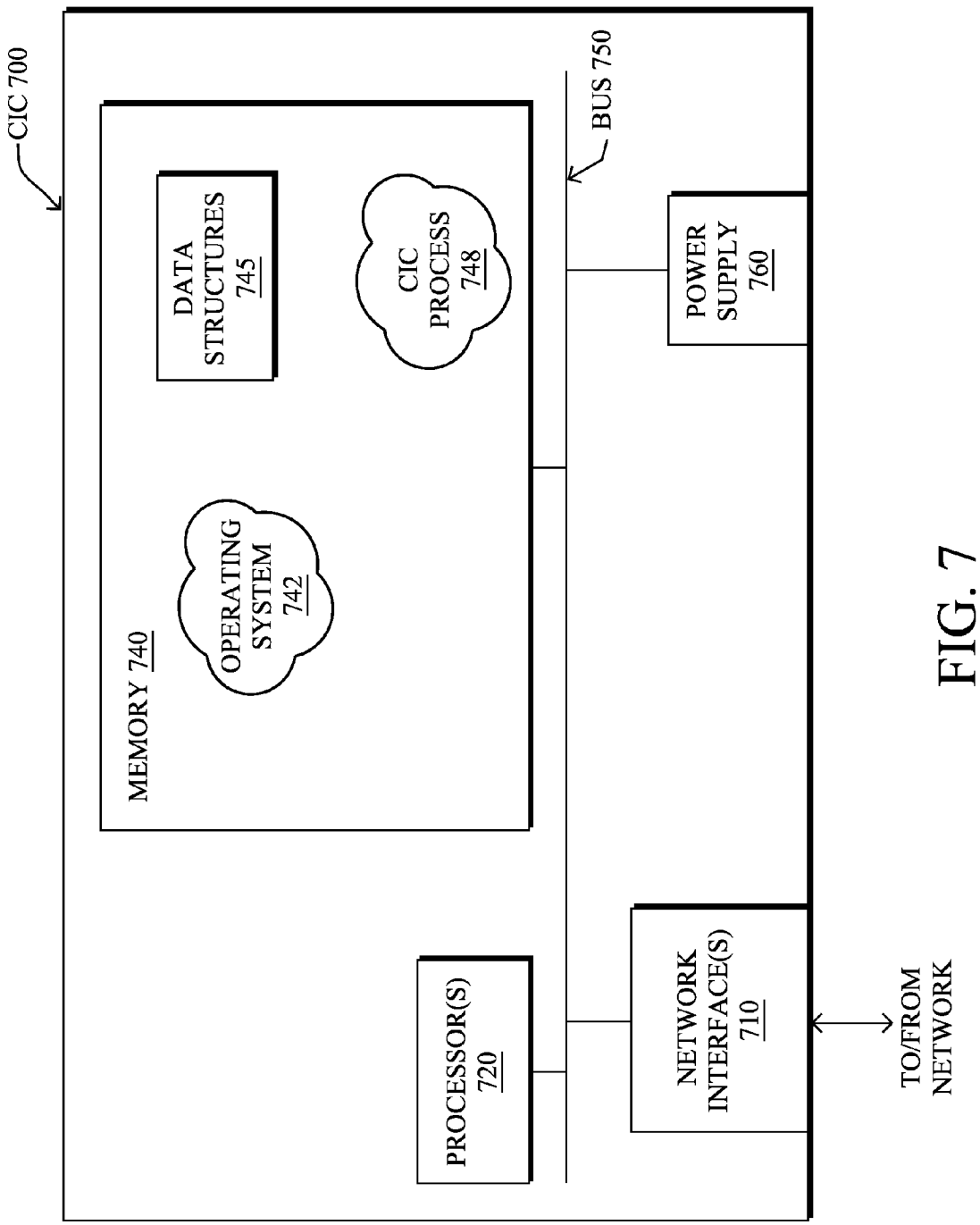
FIG. 7 illustrates an example of a central intelligence controller (CIA) device.

FIG. 7 is a schematic block diagram of an example device 700 that may be used with one or more embodiments described herein as a CIC. Similar to device 600, the CIC device 700 may comprise one or more network interfaces 710, at least one processor 720, and a memory 740 interconnected by a system bus 750, as well as a power supply 760 (e.g., plug-in). Within the memory 740 (which may store data structures 745), an operating system 742 functionally organizes the device by, inter alia, invoking operations in support of software processes and/or services executing on the device, such as a "CIC process" 748, as described herein.

In particular, as noted above, the CIC(s) 700 is(/are) configured to perform complex tasks for overarching control of MCO and DIA operation and also configured to provide one or more interfaces to receive a set of user-defined rules for the MCO and DIA operation. As such, CIC process 748 contains computer executable instructions executed by the processor 720 to perform functions related to such CIC actions, accordingly. As described herein, therefore, CIC process 748 is configured to perform complex tasks for overarching control of MCO and DIA operation performed by the CICs, such as security operations, performance monitoring, and SLA management, etc. In addition, as mentioned above, the CIC process 748 may also be configured for receiving instructions from the DIAs, and to correspondingly update MCO operation (e.g., via the DIAs or directly to the MCOs).

Such an architecture as described above specifies a strong paradigm shift from conventional computer architectures. For example, in contrast with current models, QoS is activated on each node regardless of traffic observation and SLAs, whereas in this model an external node (hosting the DIA) determines if/when/whether QoS must be activated based on traffic observation and SLAs provided by the CIC. In today's network, routing is either fully centralized (e.g., in most optical/SDH networks) or distributed. In the architecture as described herein, however, the role of the LBR (DIA 600) is to iteratively improve and/or build the routing topology if/when/where required. The NMS paradigm is also changed: instead of a peer-to-peer model between an NMS and device, intermediate intelligence is added into the network, thus performing a number is of NMS tasks at the DIAs, accordingly.

Dynamic QoS Activation

As noted above, large-scale IP smart object networks pose a number of technical challenges. For instance, the degree of density of such networks (such as Smart Grid networks with a large number of sensors and actuators, smart cities, or advanced metering infrastructure or "AMI" networks) may be extremely high: it is not rare for each node to see several hundreds of neighbors. This is particularly problematic for LLNs, where constrained links can wreak havoc on data transmission.

Applying quality of service (QoS) techniques are thus generally desired in order to maintain data transmission reliability and control delay in LLNs. To illustrate the critical need for QoS in LLNs, take the example of AMI, which is one representative use for LLNs. As indicated in its name, AMI includes a number of applications in addition to Automated Meter Reading (AMR). Utilities have documented the following list of applications that must operate over AMI networks:

1) Automated Meter Reading that involves periodically retrieving meter readings from each individual meter to a head-end server;
2) Firmware upgrades that involve communicating relatively large firmware images (500 KB or more) from a head-end server to one, multiple, or all devices;
3) Retrieving load curves;
4) Real-time alarms generated by meters (e.g., power outage events, gas leaks, etc.);
5) Periodically retrieving network management information from each meter to a Network Management System (NMS);
6) Supporting demand response applications by sending multicast messages from a head-end device to a large numbers of meters;
7) Etc.

These different applications have significantly different traffic characteristics and SLAs (e.g., unicast vs. multicast, small units of data vs. large units of data, low-latency vs. latency-tolerant, flows toward head-end vs. away from head-end). Furthermore, these applications must operate simultaneously over a highly constrained LLN network. An LLN can easily experience congestion especially when different applications are sending traffic simultaneously. Without proper mechanisms, these situations can cause networks to violate critical SLAs (e.g., delaying the reception of critical alarms from a meter).

One main issue with current existing models lies in the complexity of the overall QoS architecture on constrained devices. QoS techniques have been developed over the past two decades relying on several components: (1) Packet coloring and classification (by applications or Edge network entry points); (2) Congestion avoidance algorithms with random drops for back-pressure on TCP (e.g., weighted random early detection or "WRED"); (3) Queuing disciplines (e.g., preemptive queuing, round robin, dynamic priorities); (4) Bandwidth reservation (e.g., Diffsery (by CoS), Intsery (RSVP(-TE)); and (5) Input/Output traffic shaping, to mention a few (as will generally be understood by those skilled in the art).

However, since the devices of an LLN are also constrained, the complexity of QoS can be problematic. That is, a primary challenge lies in the overall complexity of QoS architectures in LLNs. For instance, policies must the specified for packet coloring, congestion avoidance algorithms must be configured on nodes, in addition to queuing disciplines. These algorithms all generally require a deep knowledge of the traffic pattern, link-layer characteristics, node resources, etc., and comprise a number of parameters to configure on each individual device to effectively provide adequate network-wide QoS.

That being said, the techniques herein propose a radically different approach to conventional QoS techniques, with the objective of making use of extremely simple (sometimes no) QoS mechanisms, where all parameters are determined according to traffic observation at the LBR (e.g., DIA) and then dynamically activated on the end is devices (e.g., MCOs). That is, the techniques herein generally consist of performing complex tasks on DIAs/LBRs where processing power is available by: 1) identifying, based on timestamps and local policies, whether QoS mechanisms should be configured (and where) in the network; 2) downloading local QoS configuration on the MCOs, where needed; 3) continuing to monitor the traffic and assess whether or not the SLAs are met, thus potentially further adjusting the QoS parameters; and 4) dynamically determining when to de-configure QoS mechanisms in the network according to traffic observations.

Specifically, according to one or more embodiments of the disclosure as described in detail below, a distributed intelligence agent (DIA) in a computer network performs deep packet inspection on received packets to determine packet flows, and calculates per-flow service level agreement (SLA) metrics for the packets based on timestamp values placed in the packets by respective origin devices in the computer network. By comparing the SLA metrics to respective SLAs to determine whether the respective SLAs are met, then in response to a particular SLA not being met for a particular flow, the DIA may download determined quality of service (QoS) configuration parameters to one or more visited devices along n calculated paths from a corresponding origin device for the particular flow to the DIA (e.g., determined by and received from the DIA-R 648*a*). In addition, in one or more embodiments, the QoS configuration parameters may be adjusted or de-configured based on whether they were successful.

Illustratively, the techniques described herein with relation to the DIA (or LBR) actions may be performed by hardware, software, and/or firmware, such as in accordance with the DIA process 648, or more particularly, the DIA-Q (QoS) process 648*b*, which may contain computer executable instructions executed by the processor 620 to perform functions relating to the novel techniques described herein. Alternatively, with relation to the MCO (or LLN origin/visited devices) actions may be performed by hardware, software, and/or firmware, such as in accordance with the MCO process 548, which may contain computer executable instructions executed by the processor 520 to also perform functions relating to the novel techniques described herein.

Figure 8:
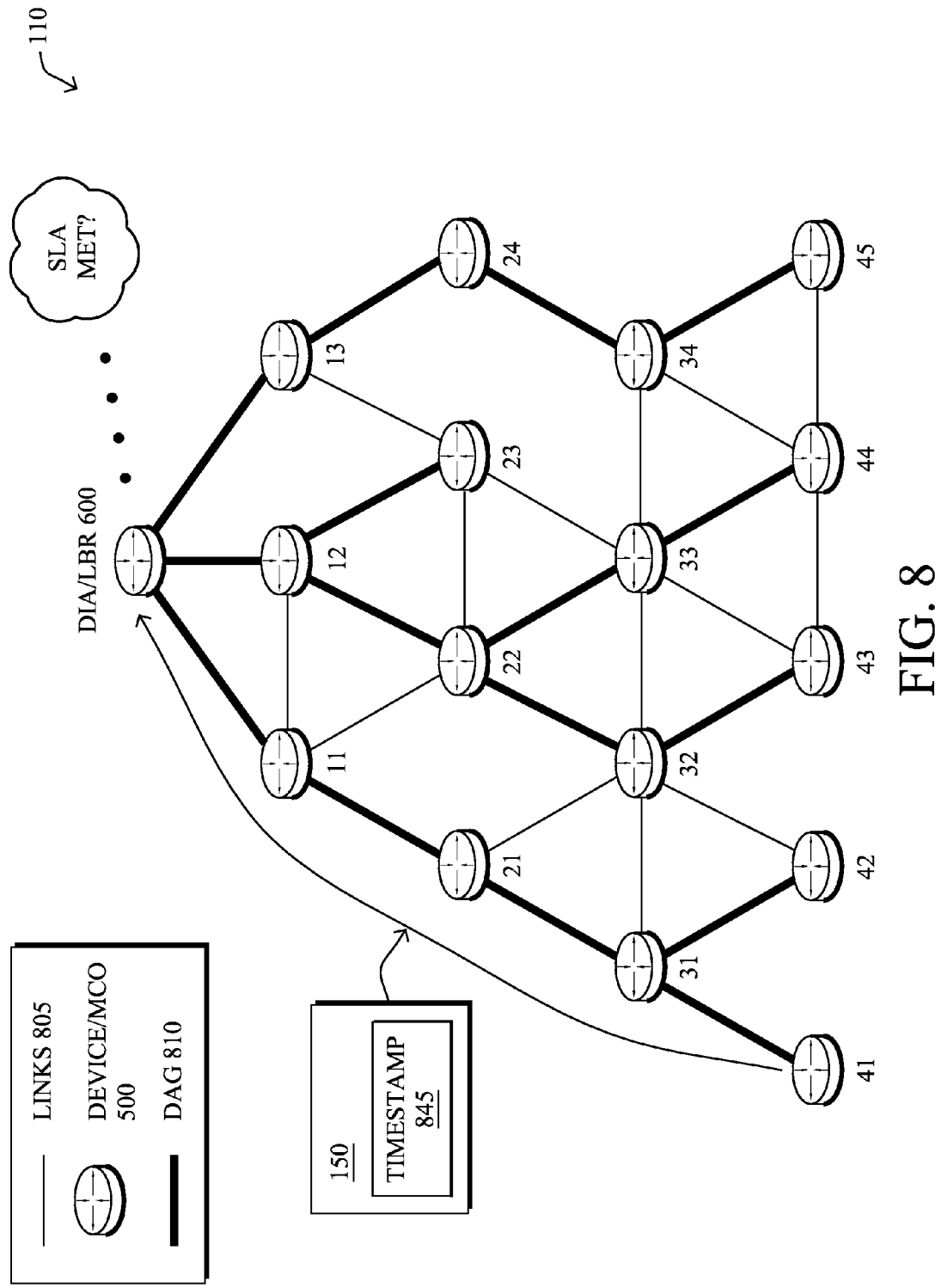
FIG. 8 illustrates an example packet transmission through a directed acyclic graph (DAG) within a particular network domain (LLN or IoT domain)

In addition, as an example representation of an LLN or IoT domain 110 of FIG. 1, FIG. 8 is a schematic block diagram of an example computer network 800 illustratively comprising nodes/devices (e.g., labeled as shown, "LBR/root," "11," "12," . . . "45,") interconnected by various methods of communication. For instance, the LBR/root device may be configured as a DIA 600, while the remaining devices 11-45 may be MCOs 500, according to the illustrative architecture described above.

As noted above, the example RPL protocol provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 150, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements. Note that while the RPL protocol may define a complete set of functionalities, in order to maintain a simplified process on the MCOs, a reduced version of RPL may be used, e.g., a minimal subset of functionalities to create a routing topology.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a is node is from a root, the higher is the rank of that node). Note also that a tree is a kind of DAG, where each device/node in the DAG generally has one parent or one preferred parent. DAGs may be built (e.g., by routing process 548*a*) based on an Objective Function (OF), the role of which to specify rules on how to build the DAG (e.g. number of parents, backup parents, etc.). However, to keep the process simple, DAGs may be built by MCOs without the use of an Objective Function, and may instead use very basic next-hop selection algorithms.

FIG. 8 thus illustrates an example simplified DAG that may be created, e.g., through the techniques described above, within an LLN or IoT network 110 of FIG. 1. For instance, certain links 805 may be selected for each node to communicate with a particular parent (and thus, in the reverse, to communicate with a child, if one exists). These selected links form the DAG 810 (shown as bolded lines), which extends from the root node toward one or more leaf nodes (nodes without children). Traffic/packets 150 may then traverse the DAG 810 in either the upward direction toward the root or downward toward the leaf nodes, particularly as described herein.

Operationally, according to the embodiments herein, it is important to note that a major component of the techniques herein consists of not activating any QoS mechanisms on the LLN devices, e.g., such as where they are illustratively MCOs 500 as described above. By contrast with current approaches where QoS mechanisms are pre-configured on each device, once an MCO joins the LLN (DAG 810), it may start forwarding traffic using a best effort approach, where no queuing, no (W)RED, no bandwidth reservation, and no packet coloring/marking technique is activated on the MCO after startup, (e.g., bootstrapping). That is, at first an origin device (origin MCO, e.g., node 41) does not make use of any packet coloring when receiving a packet from a host (should the host not have "colored" the packet, e.g., using the IPv6 DS byte), thus not requiring to download a packet classification policy and use (deep) packet inspection. As described below, the choice to color (mark) a packet and according to which rules is determined/computed by the LBR (DIA 600) where processing power is available to perform deep packet inspection and to generate a corresponding classification policy. Accordingly, at this is stage the MCO simply timestamps the packet 150 (with timestamp 845) and forwards it along the shortest path as determined by the routing table (e.g., path 41-31-21-11-LBR). Visited devices/MCOs along the path thus receive the timestamped packets, and forward them without applying any deep packet inspection or QoS mechanisms.

Upon reaching the LBR/DIA, a deep packet inspection is performed on the packets to determine packet flows, and a calculation is performed to determine one or more per-flow SLA metrics (e.g., delays and/or jitter within a flow) experienced by the packet within the LLN based on timestamp values placed in the packets by respective origin devices. These SLA metrics are then checked against (compared to) the expected SLA configured for the flow to determine whether the respective SLAs are met. Notably, the DIA may have itself downloaded the SLAs from a configuration server such as an NMS, or alternatively (or said differently), having received the respective SLAs at the DIA from a CIC 700.

Figure 9A:
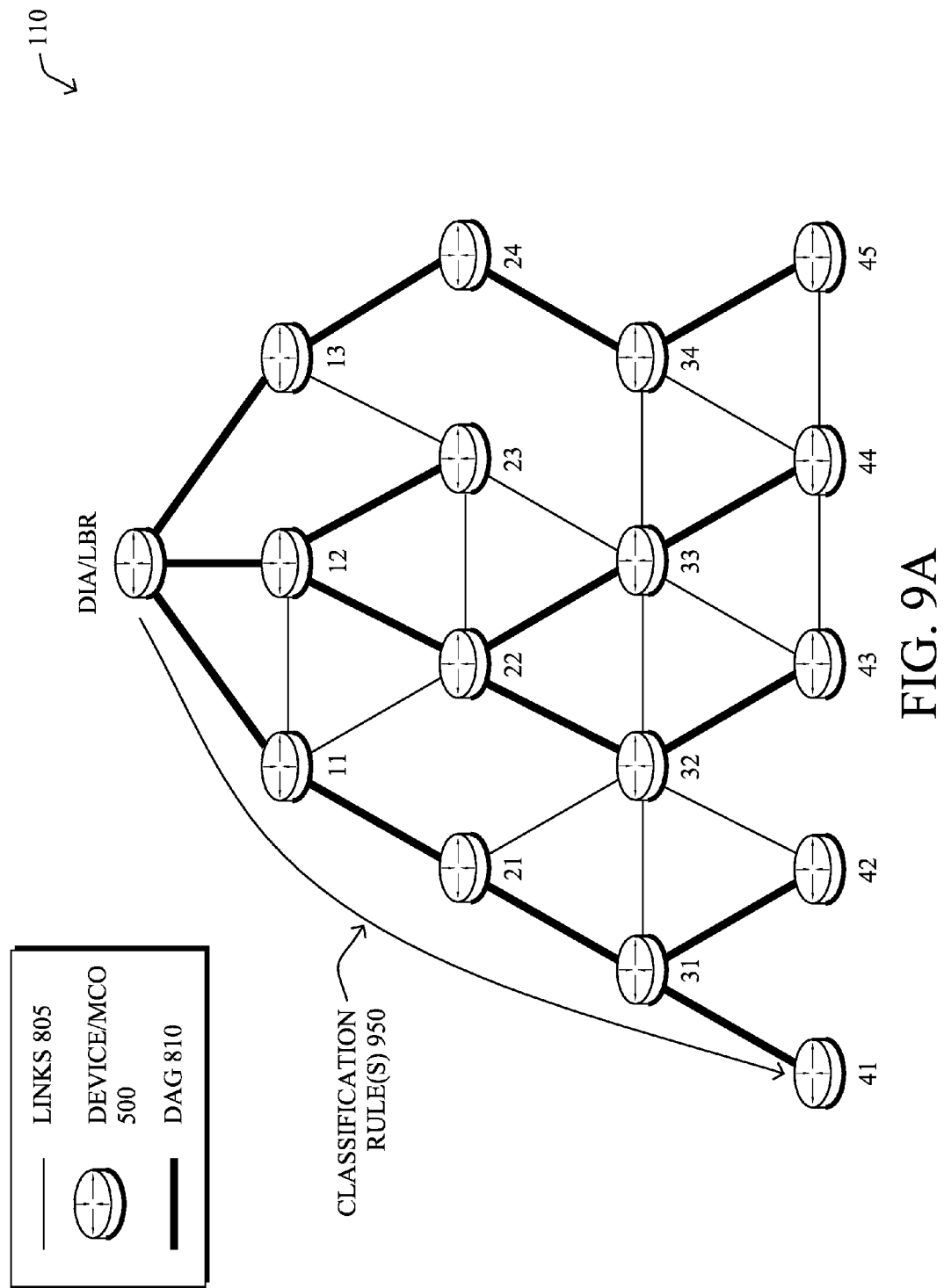
FIGS. 9A-9B illustrate example quality of service (QoS) configuration controls in the network domain of FIG. 8.

If the expected SLA is met, no further action is performed. If, however, the expected SLA is not met, e.g., for a specific period of time, as determined by the policy or even by a learning machine, the LBR/DIA performs the following set of actions. First, a classification rule may be downloaded to the corresponding origin device/MCO (e.g., node 41) in order to mark the packets of the flow. For example, "Mark the DS bytes with the value X if the UDP port=Y." Notably, this can be performed using a newly defined IPv6 unicast CoAP packet, as may be appreciated by those skilled in the art. FIG. 9A illustrates an example downloading of a classification rule 950 from the DIA (LBR) to the origin device/MCO (node 41).

Figure 9B:
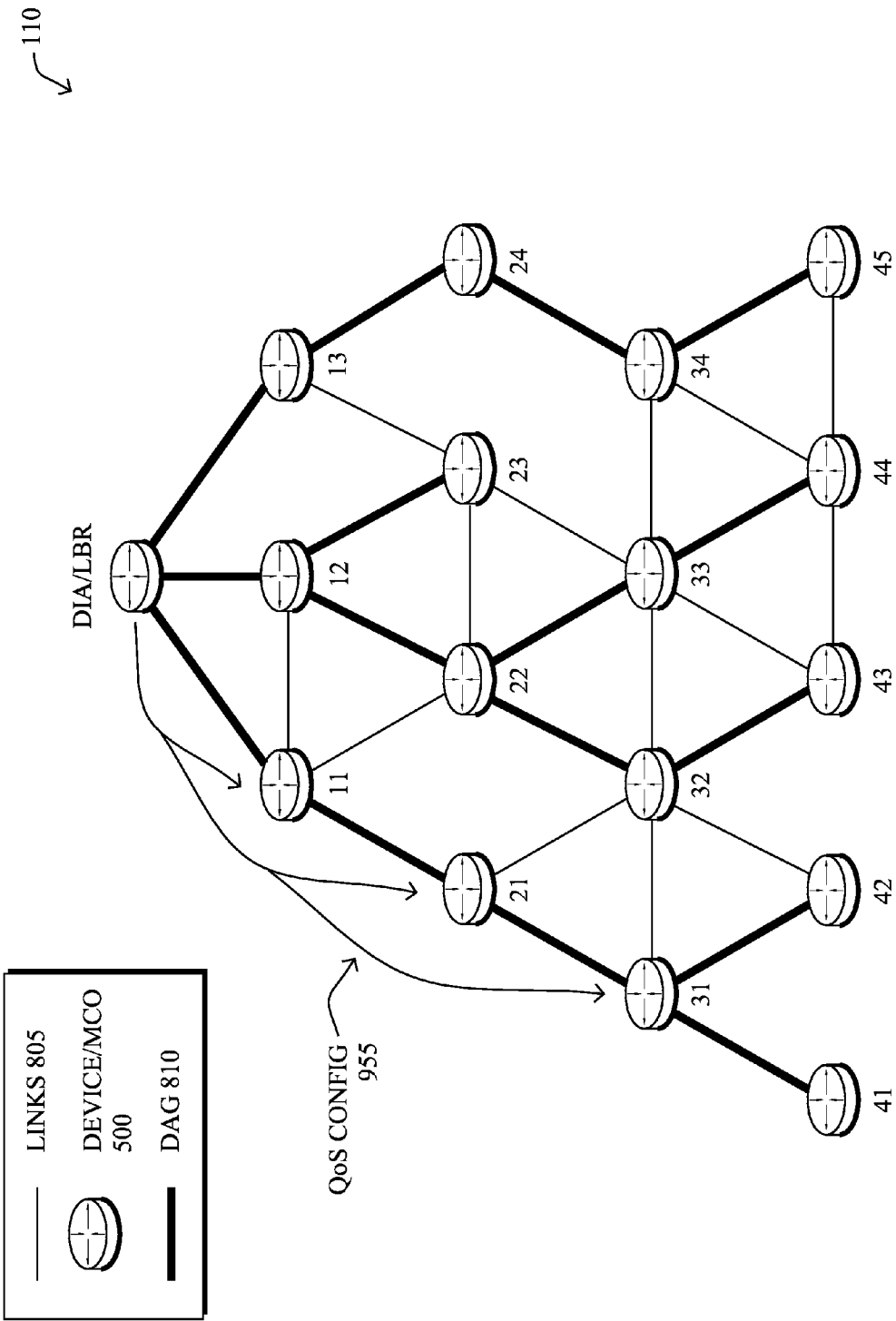

Second, a set of n paths from the origin device to the DIA/LBR is calculated. For example, these n paths can either be simulated running SPF if a Link state routing protocol is used (e.g., zOSPF), or by reversing the links of the DAG 810 (including all back-up paths/parents) in the case of RPL. At this point, a queuing/congestion avoidance policy, that is, a set of QoS configuration parameters, is determined by the DIA (e.g., configuration of three queues including a preemptive queue+RED). As such, and as shown in FIG. 9B, the QoS configuration parameters 955 may then be downloaded to each visited device/MCO along these n calculated paths, e.g., node 31, 21, and 11 (where n=1).

Figure 10:
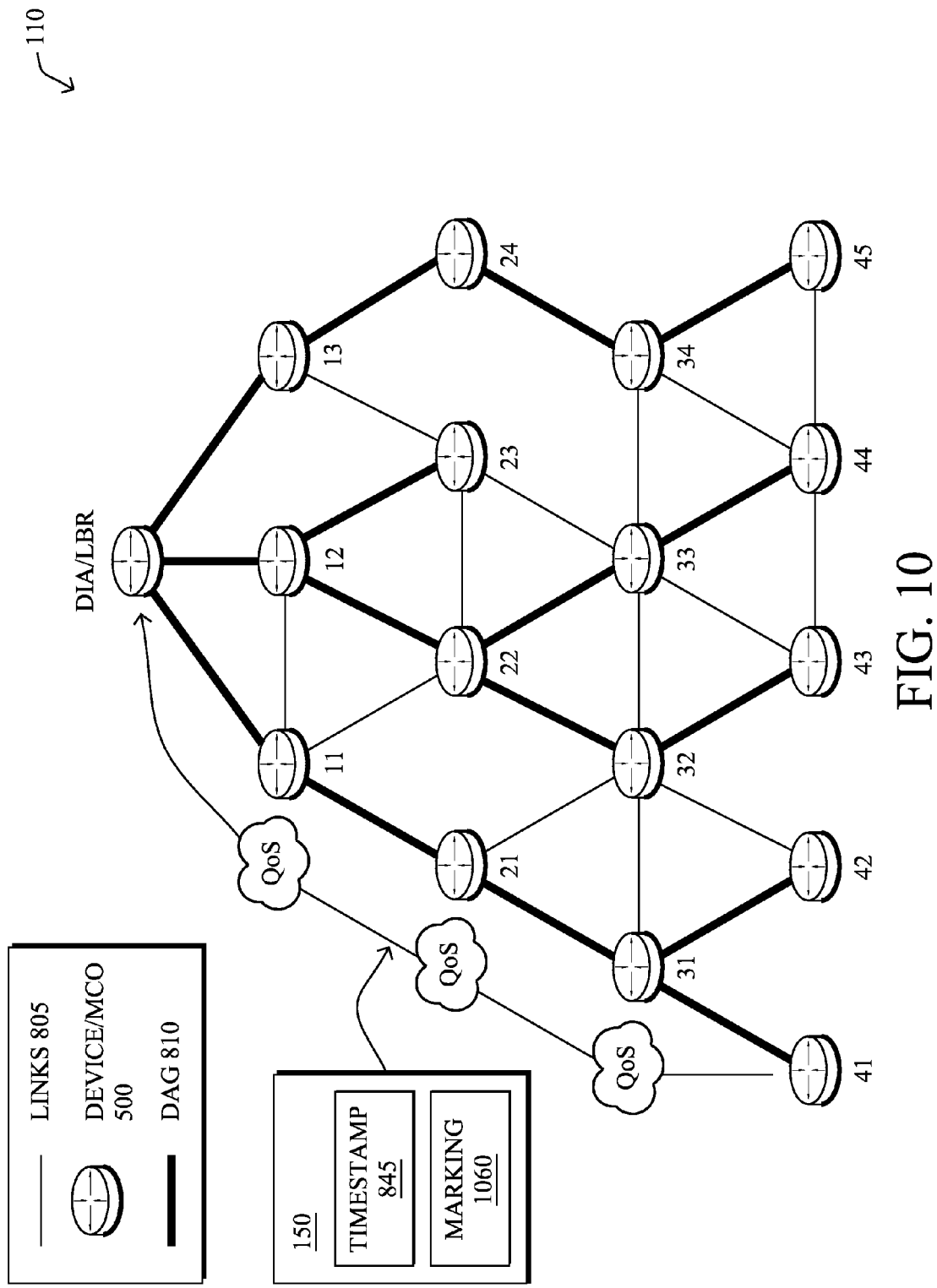
FIG. 10 illustrates an example of activated QoS in the network domain of FIG. 8.

FIG. 10 illustrates an example of activated QoS in the network domain of FIG. 8, in accordance with the downloaded QoS configuration parameters along the n paths, i.e., based on activated QoS. For instance, now packet 150, in addition to the timestamp 845, carries an added color/marking 1060 along the path through QoS-activated transit MCOs on its way to the DIA/LBR.

Third, illustratively after the expiration of a configurable timer, the DIA/LBR starts monitoring the marked (colored) packets 150 to re-determine whether the required SLAs are met based again on the timestamp 845. Alternatively, the DIA(-Q) may request that the end node (MCO) send packets for an immediate check after activating remote QoS. If an SLA is not met, the QoS parameters may be adjusted accordingly. For example, an increased bandwidth allotment may be assigned to the queue used specifically for a traffic type of the particular flow). In this manner, the mechanism described above is iterative, thus using a learning machine. In addition, in yet another embodiment, the DIA may decide to dynamically de-configure QoS on some devices if, for example, it determines that the traffic flow has decreased in the network and consequently QoS is no longer required, thus reducing packet processing on DCOs and save energy. Said differently, in response to a particular SLA being met for a particular flow based on the monitored marked packets, e.g., for a particular length of time, the DIA may de-configure (or else reduce/relax) the QoS configuration parameters on the visited devices, accordingly.

According to one or more specific embodiments herein, the DIA may also determine (and store) historical SLA metric data so as to determine traffic patterns based thereon. From such traffic patterns, it is possible to proactively configure QoS configuration parameters, i.e., to proactively act upon the MCOs to activate/deactivate QoS in the LLN. For example, if it is determined that the traffic load crosses some low threshold between 1am and 6 am so that QoS is no longer required, it is usually beneficial to deactivate QoS on the MCOs during this time so as to reduce the packet handling overhead and thus save energy.

In addition, in certain embodiments herein, by observing the traffic load, the DIA may decide to activate QoS on some MCOs prior to observing any missed SLAs. That is, the DIA may determine that a particular SLA is not being met for a particular flow based on a "pre-breach" threshold of the particular SLA, i.e., a level prior to actually not meeting the SLA. Moreover, the pre-breach threshold may actually be a rate of change of the corresponding SLA metrics, for example, if the second derivative of the traffic load crosses some threshold.

Figure 11A:
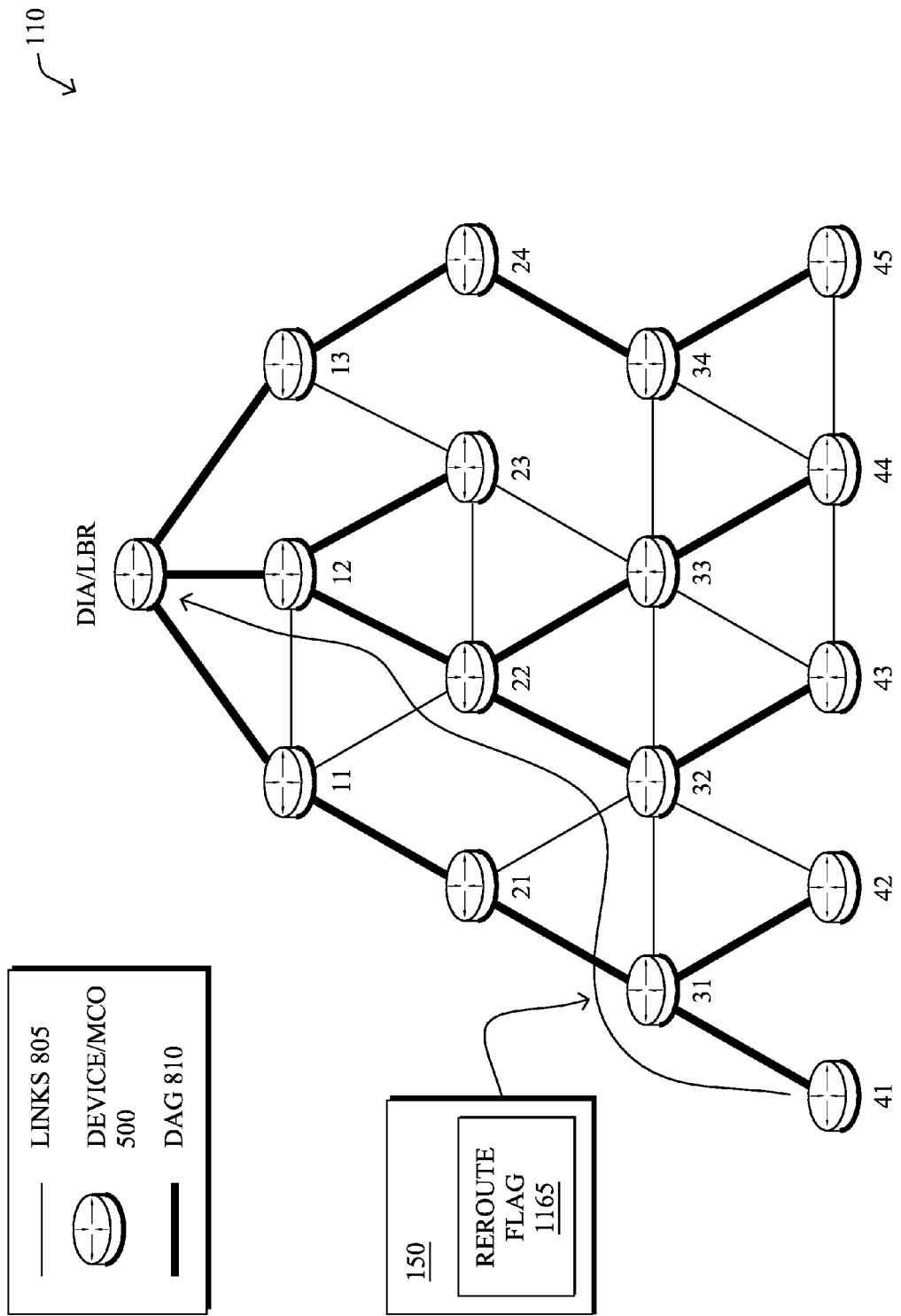
FIGS. 11A-11B illustrate an alternative example of QoS configuration control for alternate path forwarding.
Figure 11B:
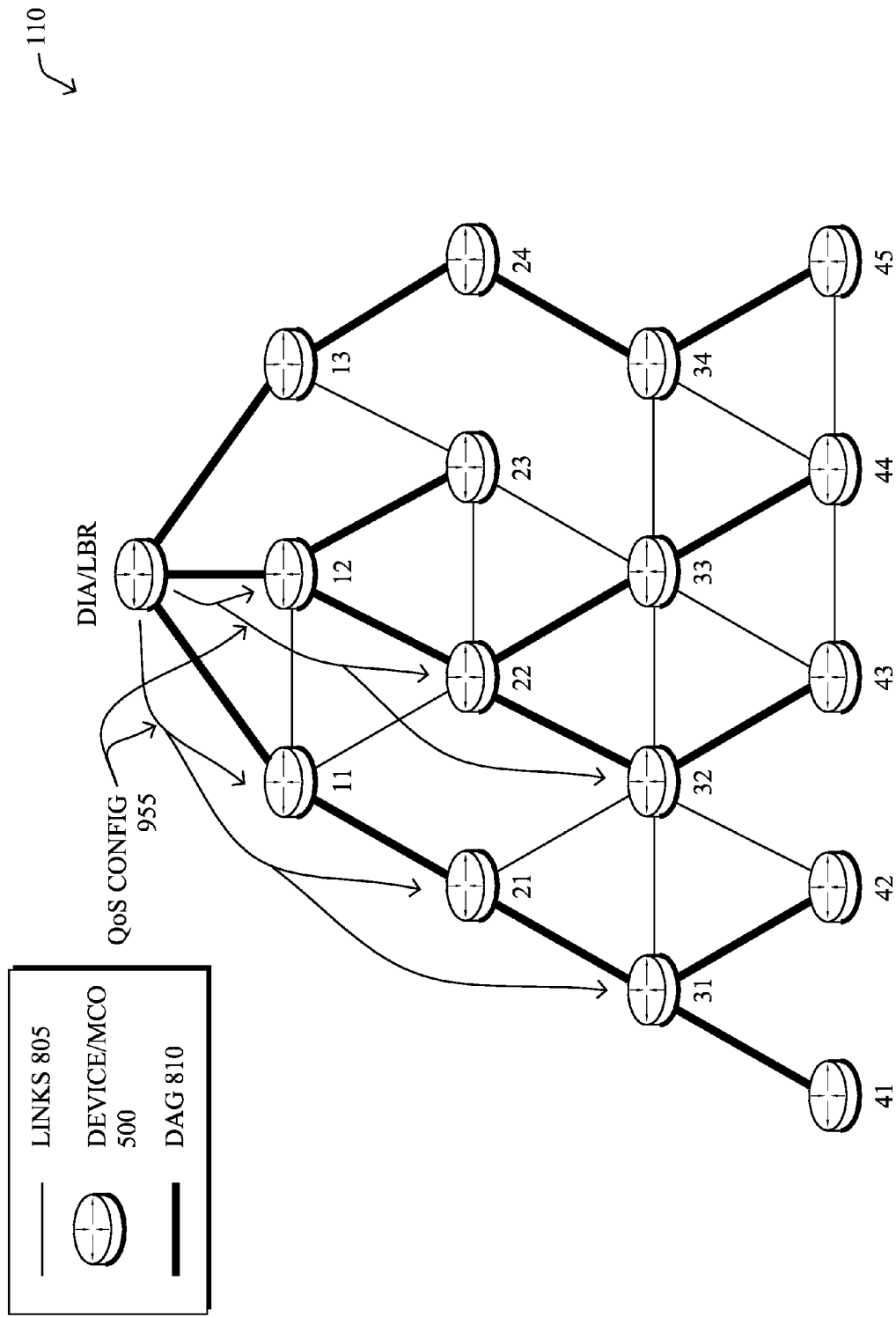

Note that the value of n (for the number of calculated and managed paths above) may be equal to 1 by configuration on the DIA, in which case the SLA may be degraded should the primary path fail. In yet another embodiment, however, each time a packet is rerouted, a newly defined flag may be set by the MCO that used an alternate next-hop so as to indicate that the packet did not follow the preferred path. Consequently, the DIA may decide to increase the value of n. For example, the LBR may first decide to only activate QoS on the preferred path (n=1) and if a particular number of received packets are flagged as rerouted (utilizing an alternate path) and do not meet the SLAs, the LBR may decide to increase the value of n, and configure QoS on secondary/alternate paths, accordingly. FIGS. 11A-11B illustrate an alternative example of QoS configuration control for alternate path forwarding, where a reroute flag 1165 is set by a rerouting MCO (e.g., node 31), such that subsequent QoS configuration 955 may be provided to visited devices on multiple paths, as noted above.

Figure 12:
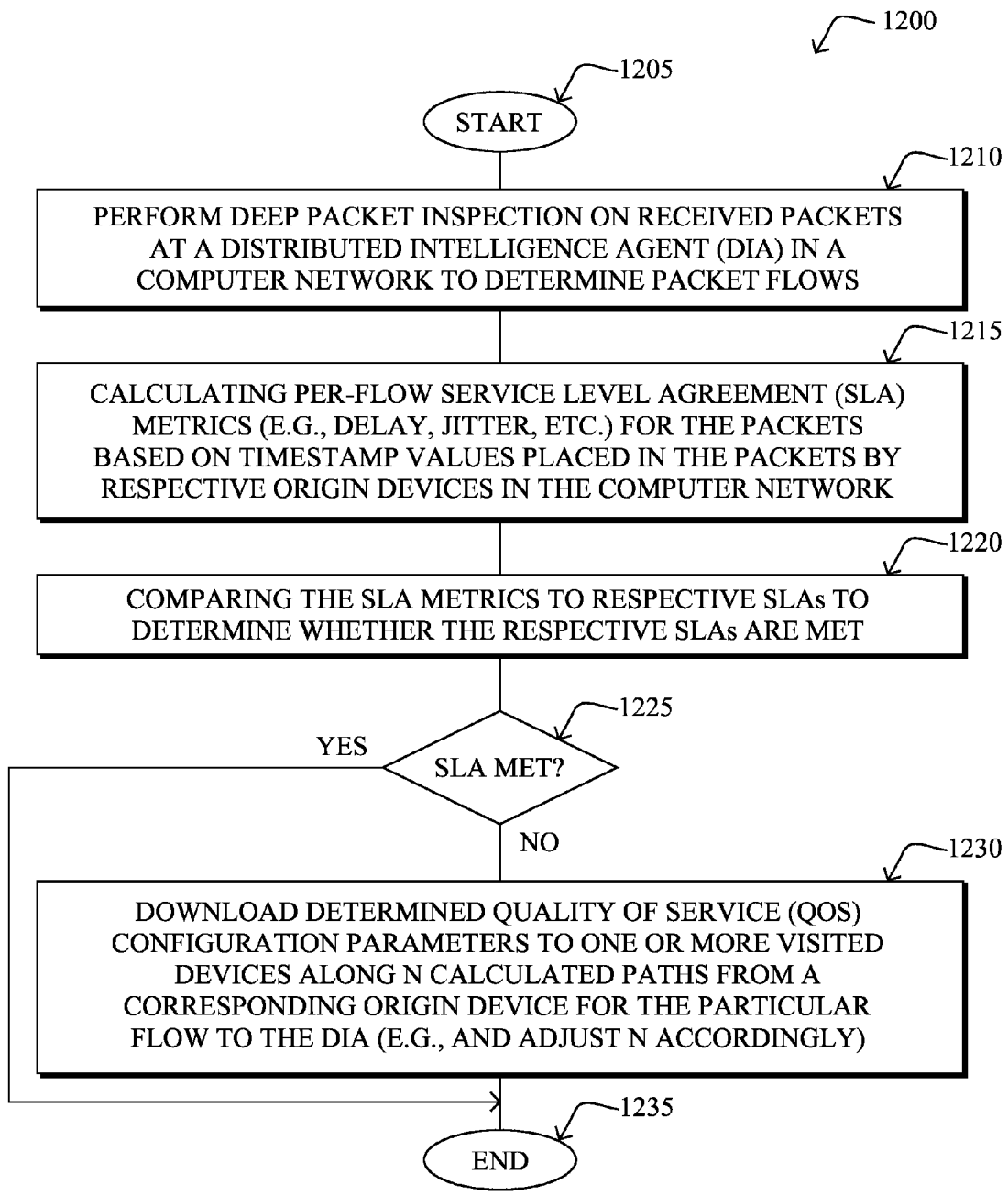
FIGS. 12-14 illustrate example simplified procedures for QoS activation and management in LLNs, from the perspective of the border router or distributed intelligence agent (DIA)

FIG. 12 illustrates an example simplified procedure for QoS activation and management in LLNs in accordance with one or more embodiments described herein, from the perspective of the border router or DIA. The procedure 1200 starts at step 1205, and continues to step 1210, where, as described in greater detail above, a DIA 600 (e.g., LBR) performs deep packet inspection on received packets to determine packet flows. As such, in step 1215, the DIA can calculate per-flow SLA metrics (e.g., delay, jitter, etc.) for the packets based on timestamp values placed in the packets by respective origin devices in the computer network (e.g., node 41). Then, in step 1220, the DIA compares the SLA metrics to respective SLAs to determine whether the respective SLAs are met. If the SLAs are met in step 1225, then nothing needs to take place, and the procedure ends in step 1235. If, however, a particular SLA is not met in step 1225, then in step 1230 the DIA downloads determined QoS configuration parameters to one or more visited devices (e.g., 31, 21, 11) along n calculated paths from a corresponding origin device for the particular flow to the DIA. Note that as described above, the value of n may be adjusted according to whether backup/alternate paths are used in the network. The illustrative procedure 1200 ends in step 1235, though it is noted that operation may continue to calculate per-flow SLA metrics on the fly in order to dynamically adjust QoS configuration, accordingly.

Figure 13:
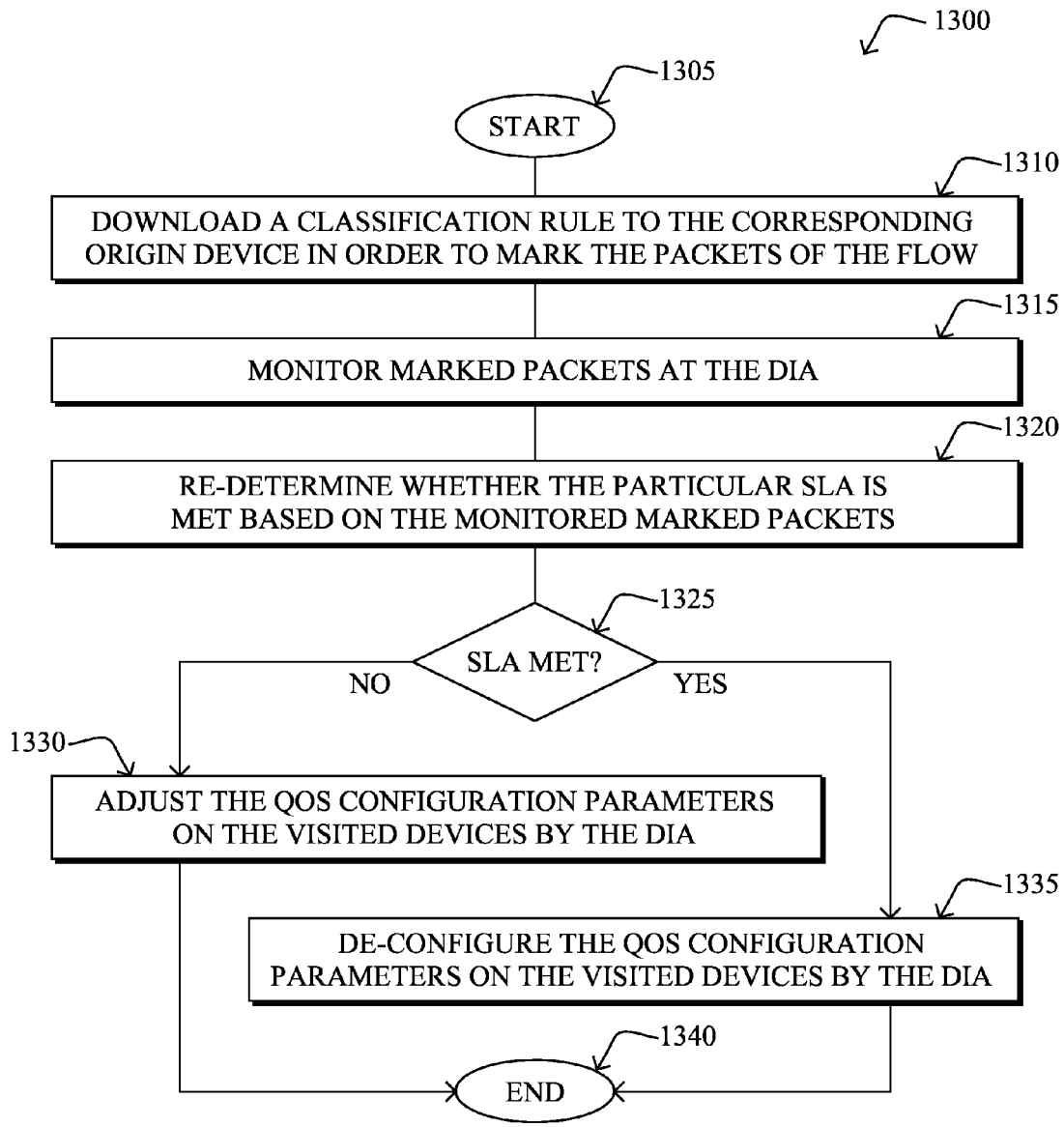

In addition, FIG. 13 illustrates an example simplified (sub-)procedure for QoS activation and management in LLNs in accordance with one or more embodiments described herein, from the perspective of the border router or DIA. The procedure 1300 starts at step 1305, and continues to step 1310, where, as described in greater detail above, in addition to downloading the determined QoS configuration parameters (step 1230 of FIG. 12) in response to the particular SLA not being met, the DIA 600 (e.g., LBR) also downloads a classification rule to the corresponding origin device in order to mark the packets of the flow. In this manner, the DIA may then monitor marked packets in step 1315 in order to re-determine whether the particular SLA is met based on the monitored marked packets in step 1320, that is, based on the QoS configuration parameters downloaded to the visited devices. If the SLA is still not met in step 1325, then in step 1330 the DIA may adjust the QoS configuration parameters on the visited devices, accordingly. Conversely, if the SLA is met in step 1325 due to the QoS configuration, it may be acceptable to de-configure the QoS configuration parameters on the visited devices in step 1335. Note that the decision to de-configure QoS configuration parameters (e.g., to deactivate QoS) may be based on how well the SLA is met in step 1325, since the activated QoS may in fact be the reason the SLA is met. Alternatively, or in addition, the de-configuration may be a gradual relaxation of QoS configuration parameters, rather than simply a deactivation of QoS altogether. The procedure 1300 illustratively ends in step 1340, notably able to resume from step 1320 to monitor marked packets for gradual adjustment of QoS (stricter or more relaxed), is accordingly.

Figure 14:
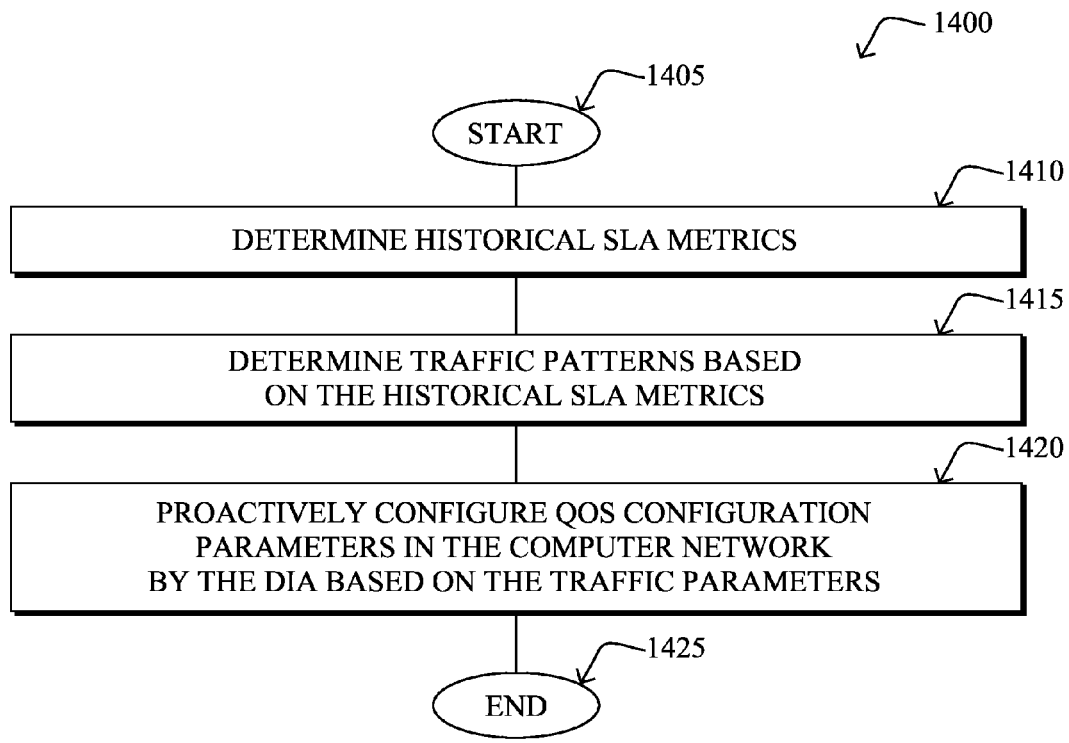

Moreover, FIG. 14 illustrates another example simplified (sub-)procedure for QoS activation and management in LLNs in accordance with one or more embodiments described herein, from the perspective of the border router or DIA. The procedure 1400 starts at step 1405, and continues to step 1410, where historical SLA metrics are determined by the DIA, in order to then determine traffic patterns based on the historical SLA metrics in step 1415. As such, in step 1420, the DIA may proactively configure QoS configuration parameters in the computer network by the DIA based on the traffic patterns as described in greater detail above. The illustrative procedure 1400 may then end in step 1425, with the noted capability to continue determining traffic patterns based on the historical SLA metrics, accordingly.

Figure 15:
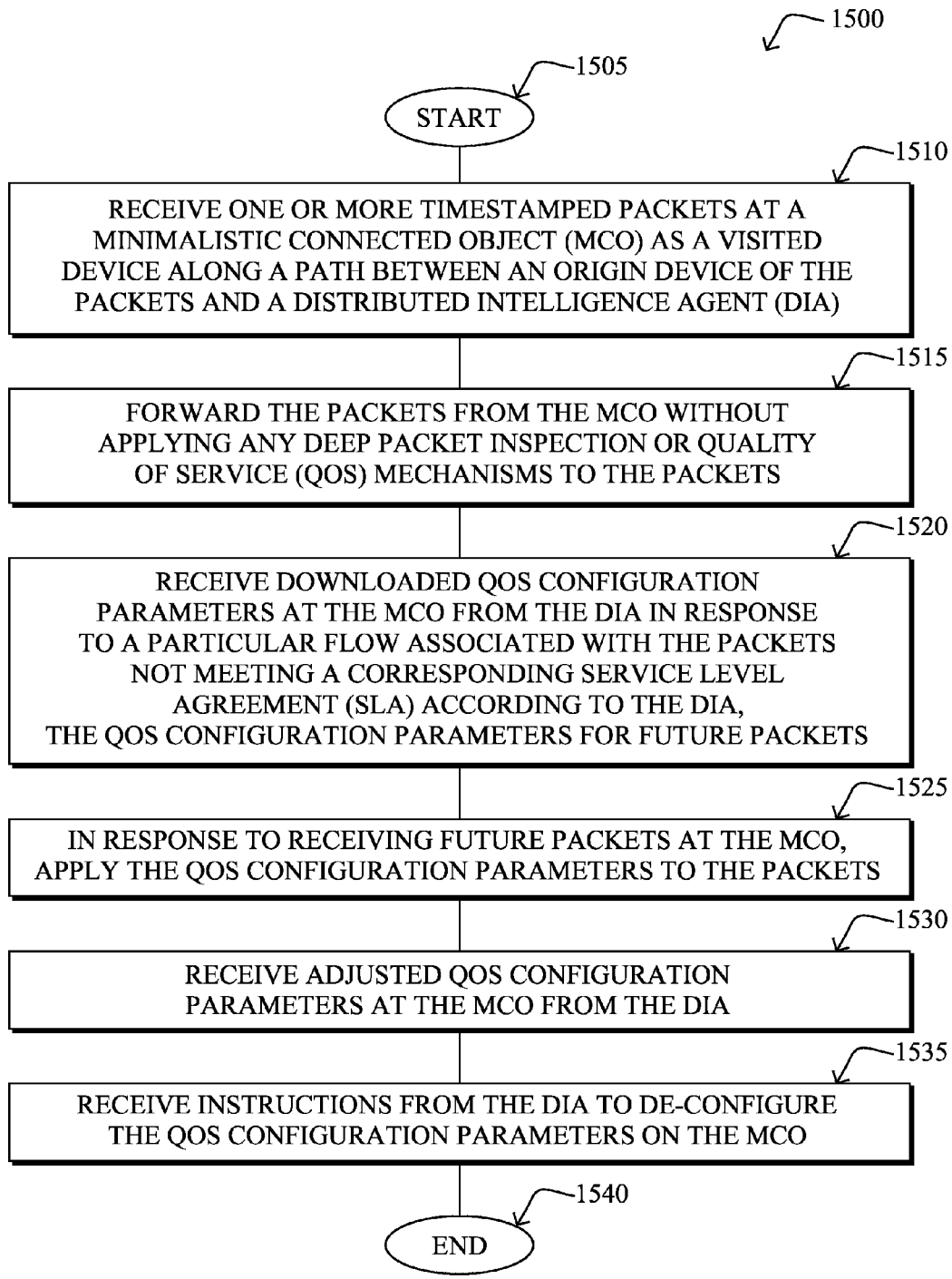
FIG. 15 illustrates another example simplified procedure for QoS activation in LLNs, from the perspective of a visited device or minimalistic connected object (MCO).

Lastly, FIG. 15 illustrates another example simplified procedure for QoS activation in LLNs in accordance with one or more embodiments described herein, but now from the perspective of a visited device or MCO. The procedure 1500 starts at step 1505, and continues to step 1510, where, as described in greater detail above, an MCO, such as node 31, may receive one or more timestamped packets 150 as a visited device along a path between an origin device (e.g., node 41) of the packets and a DIA (e.g., LBR). As such, in step 1515, the MCO forwards the packets without applying any deep packet inspection or QoS mechanisms to the packets. In the event an SLA is not met (as determined by the DIA), the MCO may receive from the DIA downloaded QoS configuration parameters for future packets in step 1520. As such, in step 1525, the MCO applies the QoS configuration parameters (as directed from the DIA) to the packets. According to certain techniques described above, in step 1530 the MCO may receive adjusted QoS configuration parameters from the DIA, or else in step 1535 may receive instructions from the DIA to de-configure the QoS configuration parameters on the MCO. The illustrative procedure 1500 ends in step 1540, with the noted ability to continue executing each step (receiving packets, receiving QoS configuration/updates, and so on).

It should be noted that while certain steps within procedures 1200-1500 may be optional as described above, the steps shown in FIGS. 12-15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1500 are described separately, certain steps from each procedure may be incorporated into each other procedure, and the procedures are not meant to be mutually exclusive.

The novel techniques described herein, therefore, provide for dynamic QoS activation and management for LLNs, particularly where MCOs are used. In particular, the techniques herein allow for redistribution of QoS intelligence in the network, so as to allow for efficient use of LLN devices, e.g., MCOs. That is, with the above QoS architecture, MCOs do not need to be configured a priori with QoS mechanisms, where QoS is activated dynamically in the network if, when, and where needed thanks to traffic monitoring by the DIA (LBR). By only activating QoS where and when needed without any a priori knowledge at the MCO, the techniques herein dramatically reduce the overall complexity on the MCOs, the configuration burden, and the number of tasks handled by the MCOs, thus saving energy, which is of the utmost importance in LLNs.

While there have been shown and described illustrative embodiments that provide for dynamic QoS activation and management for LLNs, particularly where MCOs are used, it is to be understood that various other adaptations and modifications may be made within the spirit and scope of the embodiments herein. For example, the embodiments have been shown and described herein with relation to the specific illustrative IoT architecture described above for use with MCOs. However, the embodiments in their broader sense are not as limited, and may, in fact, be used with other types of networks and/or protocols, such as LLNs in general (with relatively "smart" objects), or even in networks that are not particularly low-powered or lossy. In addition, while the CICs are shown as being separate from the DIAs, in certain embodiments it is possible that the CIC functionality (CIC process 748) may reside locally on one or more DIAs, i.e., the CIC and DIA are a single device configured with both CIC and DIA functionality. Thus (or separately), the DIA may also have an interface to receive user-defined rules and configuration.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    performing deep packet inspection on received packets at a distributed intelligence agent (DIA) in a computer network to determine packet flows;
    calculating per-flow service level agreement (SLA) metrics for the packets based on timestamp values placed in the packets by respective origin devices in the computer network;
    comparing the SLA metrics to respective SLAs to determine whether the respective SLAs are met; and
    in response to a particular SLA not being met for a particular flow, downloading determined quality of service (QoS) configuration parameters to one or more visited devices along n calculated paths from a corresponding origin device for the particular flow to the DIA.

2. The method as in claim 1, wherein the SLA metrics are selected from delay and jitter.

3. The method as in claim 1, further comprising:
in response to the particular SLA not being met for the particular flow, downloading a classification rule to the corresponding origin device in order to mark the packets of the flow;
monitoring marked packets at the DIA; and
re-determining whether the particular SLA is met based on the monitored marked packets.

4. The method as in claim 3, further comprising:
in response to the particular SLA still not being met for the particular flow based on the monitored marked packets, adjusting the QoS configuration parameters on the visited devices by the DIA.

5. The method as in claim 3, further comprising:
in response to the particular SLA being met for the particular flow based on the monitored marked packets, de-configuring the QoS configuration parameters on the visited devices by the DIA.

6. The method as in claim 1, wherein determined QoS configuration parameters comprise an increased bandwidth allotment specific to a traffic type of the particular flow.

7. The method as in claim 1, wherein determining that the particular SLA is not being met for the particular flow is based on a pre-breach threshold of the particular SLA.

8. The method as in claim 7, wherein the pre-breach threshold is a rate of change of the corresponding SLA metrics.

9. The method as in claim 1, further comprising:
determining historical SLA metrics;
determining traffic patterns based on the historical SLA metrics; and
proactively configuring QoS configuration parameters in the computer network by the DIA based on the traffic patterns.

10. The method as in claim 1, wherein n=1, the method further comprising:
in response to a particular number of packets for the flow having been flagged as utilizing an alternate path from the origin device to the DIA, increasing the value of n.

11. The method as in claim 1, further comprising:
receiving the respective SLAs at the DIA from a central intelligence controller (CIC) in the computer network.

12. The method as in claim 1, wherein the visited devices are minimalistic connected objects (MCOs).

13. An apparatus, comprising:
one or more network interfaces to communicate in a computer network;
a processor coupled to the network interfaces and adapted to execute one or more processes; and
a memory configured to store a process executable by the processor, the process when executed operable to:
perform deep packet inspection on received packets at the apparatus to determine packet flows;
calculate per-flow service level agreement (SLA) metrics for the packets based on timestamp values placed in the packets by respective origin devices in the computer network;
compare the SLA metrics to respective SLAs to determine whether the respective SLAs are met; and
in response to a particular SLA not being met for a particular flow, is download determined quality of service (QoS) configuration parameters to one or more visited devices along n calculated paths from a corresponding origin device for the particular flow to the apparatus.

14. The apparatus as in claim 13, wherein the SLA metrics are selected from delay and jitter.

15. The apparatus as in claim 13, wherein the process when executed is further operable to:
in response to the particular SLA not being met for the particular flow, download a classification rule to the corresponding origin device in order to mark the packets of the flow;
monitor marked packets; and
re-determine whether the particular SLA is met based on the monitored marked packets.

16. The apparatus as in claim 15, wherein the process when executed is further operable to:
in response to the particular SLA still not being met for the particular flow based on the monitored marked packets, adjust the QoS configuration parameters on the visited devices.

17. The apparatus as in claim 15, wherein the process when executed is further operable to:
in response to the particular SLA being met for the particular flow based on the monitored marked packets, de-configure the QoS configuration parameters on the visited devices.

18. The apparatus as in claim 13, wherein the process when executed is further operable to:
determine that the particular SLA is not being met for the particular flow based on a pre-breach threshold of the particular SLA.

19. The apparatus as in claim 13, wherein the process when executed is further operable to:
determine historical SLA metrics;
determine traffic patterns based on the historical SLA metrics; and
proactively configure QoS configuration parameters in the computer network based on the traffic patterns.

20. A tangible, non-transitory, computer-readable media having software encoded thereon, the software when executed by a processor operable to:
perform deep packet inspection on received packets at a distributed intelligence agent (DIA) in a computer network to determine packet flows;
calculate per-flow service level agreement (SLA) metrics for the packets based on timestamp values placed in the packets by respective origin devices in the computer network;
compare the SLA metrics to respective SLAs to determine whether the respective SLAs are met; and
in response to a particular SLA not being met for a particular flow, download determined quality of service (QoS) configuration parameters to one or more visited devices along n calculated paths from a corresponding origin device for the particular flow to the DIA.

21. The computer-readable media as in claim 20, wherein the software when executed is further operable to:
in response to the particular SLA not being met for the particular flow, download a classification rule to the corresponding origin device in order to mark the packets of the flow;
monitor marked packets at the DIA;
re-determine whether the particular SLA is met based on the monitored marked packets;
in response to the particular SLA still not being met for the particular flow based on the monitored marked packets, adjusting the QoS configuration parameters on the visited devices by the DIA; and in response to the particular SLA being met for the particular flow based on the monitored marked packets, de-configuring the QoS configuration parameters on the visited devices by the DIA.

\* \* \* \* \*

UNITED STATES PATENT AND TRADEMARK OFFICE
CERTIFICATE OF CORRECTION

Page 1 of 2

| | |
|---|---|
| PATENT NO. | : 8,996,666 B2 |
| APPLICATION NO. | : 13/331890 |
| DATED | : March 31, 2015 |
| INVENTOR(S) | : Jean-Philippe Vasseur |

It is certified that error appears in the above-identified patent and that said Letters Patent is hereby corrected as shown below:

Specification

Please amend column 3, line 6 as follows:
    straints on [[is]] resources such as energy, memory, computa-

Please amend column 4, line 24 as follows:
    features within the Field Area Network itself. A [[is]] network

In column 5, line 16, please replace
    "statefull" with "stateful"

In column 5, line 38, please replace
    "15.4 g" with "15.4g"

Please amend column 6, line 9 as follows:
    grow linearly with the size of these networks and the [[is]]

Please amend column 7, line 27 as follows:
    network [[is]] dynamics and behavior trends, such that the DIA

Please amend column 8, line 44 as follows:
    tocols. Note, further, that the nodes may [[is]] have two different

Please amend column 9, line 20 as follows:
    the DIAs [[is]] as mentioned below, or else where MCOs are

Please amend column 9, line 64 as follows:
    ally organizes the [[is]] device by, inter alia, invoking operations

Signed and Sealed this
Thirteenth Day of October, 2015

Michelle K. Lee
*Director of the United States Patent and Trademark Office*

CERTIFICATE OF CORRECTION (continued)
U.S. Pat. No. 8,996,666 B2

Specification

Please amend column 10, line 38 as follows:
    mance [[is]] monitoring so as to determine whether network

Please amend column 11, line 54 as follows:
    work, thus performing a number [[is]] of NMS tasks at the DIAs,

In column 12, line 44, please replace
    "Diffsery" with "Diffserv"

In column 12, line 44, please replace
    "Intsery" with "Intserv"

Please amend column 12, line 64 as follows:
    then dynamically activated on the end [[is]] devices (e.g.,

Please amend column 14, line 15 as follows:
    root (e.g., the farther away a [[is]] node is from a root, the higher

Please amend column 14, line 57 as follows:
    at this [[is]] stage the MCO simply timestamps the packet 150

In column 15, line 67, please replace
    "lam" with "1am"

In column 15, line 67, please replace
    "6 am" with "6am"

Please amend column 17, line 20 as follows:
    adjustment of QoS (stricter or more relaxed), [[is]] accordingly.

Claims

Please amend column 19, line 66 as follows:
    particular flow, [[is]] download determined quality of